US011858063B2

(12) United States Patent
Ungaro

(10) Patent No.: US 11,858,063 B2
(45) Date of Patent: Jan. 2, 2024

(54) PHASE-MODIFIED QUASI-NON-DIFFRACTING LASER BEAMS FOR HIGH ANGLE LASER PROCESSING OF TRANSPARENT WORKPIECES

(71) Applicant: CORNING INCORPORATED, Corning, NY (US)

(72) Inventor: Craig John Mancusi Ungaro, Corning, NY (US)

(73) Assignee: Corning Incorporated, Corning, NY (US)

( * ) Notice: Subject to any disclaimer, the term of this patent is extended or adjusted under 35 U.S.C. 154(b) by 359 days.

(21) Appl. No.: 17/159,684

(22) Filed: Jan. 27, 2021

(65) Prior Publication Data

US 2021/0237198 A1 Aug. 5, 2021

Related U.S. Application Data

(60) Provisional application No. 62/969,216, filed on Feb. 3, 2020.

(51) Int. Cl.
*B23K 26/00* (2014.01)
*B23K 26/035* (2014.01)
(Continued)

(52) U.S. Cl.
CPC .......... *B23K 26/009* (2013.01); *B23K 26/035* (2015.10); *B23K 2101/36* (2018.08); *B23K 2103/54* (2018.08)

(58) Field of Classification Search
CPC ............... B23K 101/36; B23K 103/00; B23K 2101/36; B23K 2103/54; B23K 26/00;
(Continued)

(56) References Cited

U.S. PATENT DOCUMENTS 10,131,016 B1 * 11/2018 Geerlings .......... B23K 26/1224
2015/0136743 A1 5/2015 Hosseini
(Continued)

FOREIGN PATENT DOCUMENTS

CN 102123818 A 7/2011
CN 102138097 A 7/2011
(Continued)

OTHER PUBLICATIONS

A. E. Siegman, "New Developments in Laser Resonators", Invited Paper, SPIE vol. 1224 Optical Resonators, 1990, pp. -14.
(Continued)

*Primary Examiner* — Nathaniel E Wiehe
*Assistant Examiner* — Theodore J Evangelista
(74) *Attorney, Agent, or Firm* — Kevin L. Bray

(57) ABSTRACT

A method for processing a transparent workpiece that includes directing a laser beam into the transparent workpiece. A portion of the laser beam directed into the transparent workpiece comprises a laser beam focal line and generates an induced absorption to produce a defect within the transparent workpiece. The laser beam focal line includes a wavelength $\lambda$, a spot size $w_o$, a Rayleigh range $Z_R$ that is greater than $$F_D \frac{\pi w_o^2}{\lambda},$$

where $F_D$ is a value of 10 or greater, and an internal focal line angle of greater than 10°. The laser beam focal line further comprises a circular angular spectrum within the transparent workpiece and a plurality of rays. Each individual ray of the
(Continued)

plurality of rays has a same phase, ϕ, when converging to form the circular angular spectrum within the transparent workpiece.

22 Claims, 18 Drawing Sheets

(51) Int. Cl.
  *B23K 101/36* (2006.01)
  *B23K 103/00* (2006.01)
(58) Field of Classification Search
  CPC .. B23K 26/0006; B23K 26/009; B23K 26/02; B23K 26/03; B23K 26/035; B23K 26/04; B23K 26/042; B23K 26/043; B23K 26/046; B23K 26/06; B23K 26/0604; B23K 26/0613; B23K 26/0617; B23K 26/062; B23K 26/0622; B23K 26/0624; B23K 26/0626; B23K 26/064; B23K 26/0643; B23K 26/0648; B23K 26/0652; B23K 26/066; B23K 26/0661; B23K 26/0665; B23K 26/067; B23K 26/0673; B23K 26/0676; B23K 26/073; B23K 26/0732; B23K 26/0734; B23K 26/0736; B23K 26/0738; B23K 26/38; B23K 26/53
  See application file for complete search history.

(56) References Cited

U.S. PATENT DOCUMENTS

| | | |
|---|---|---|
| 2016/0054522 A1 | 2/2016 | Osellame et al. |
| 2017/0259375 A1 | 9/2017 | Kumkar et al. |
| 2018/0093914 A1* | 4/2018 | Akarapu ............ B23K 26/0608 |
| 2018/0093941 A1 | 4/2018 | Anantaneni et al. |
| 2018/0134604 A1 | 5/2018 | Ortner et al. |
| 2019/0129093 A1 | 5/2019 | Li et al. |
| 2020/0361037 A1 | 11/2020 | Ivanov et al. |

FOREIGN PATENT DOCUMENTS

| | | | |
|---|---|---|---|
| CN | 103079747 A | | 5/2013 |
| CN | 106029285 A | | 10/2016 |
| EP | 2969375 A1 | | 1/2016 |
| JP | 2012115875 A | * | 6/2012 |
| WO | 2014/144322 A1 | | 12/2014 |
| WO | 2016/010991 A1 | | 1/2016 |

OTHER PUBLICATIONS

Beck et al., "Application of cooled spatial light modulator for high power nanosecond laser micromachining," Opt. Express, vol. 18, 17059-17065 (2010).
Birch et al., "Real-time optical aberration correction with a ferroelectric liquid-crystal spatial light modulator," Applied Optics vol. 37, No. 11, 1998 pp. 2164-2169.
Borghi et al., "M2 factor of Bessel-Gauss Beams", Optics Letters, vol. 22, No. 5, 1997, pp. 262-264.
Jenne et al; "High-Quality Tailored-Edge Cleaving Using Aberration-Corrected Bessel-Like Beams"; Optics Letters; vol. 43, No. 13 (2018) pp. 3164-3167.
Jesacher et al., "Parallel direct laser writing in three dimensions with spatially dependent aberration correction," Opt. Express, vol. 18, 21090-21099 (2010).
International Search Report and Written Opinion of the International Searching Authority; PCT/US2021/015995; dated May 26, 2019; 11 pages; European Patent Office.

* cited by examiner

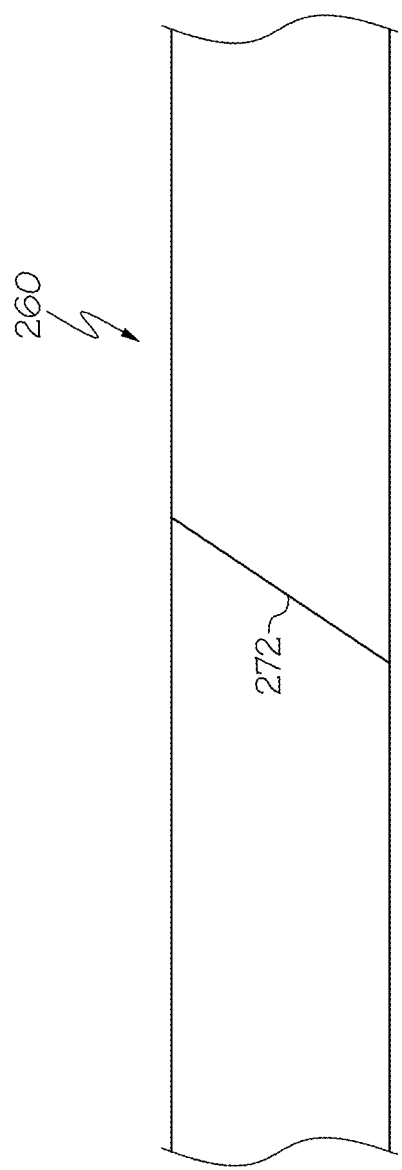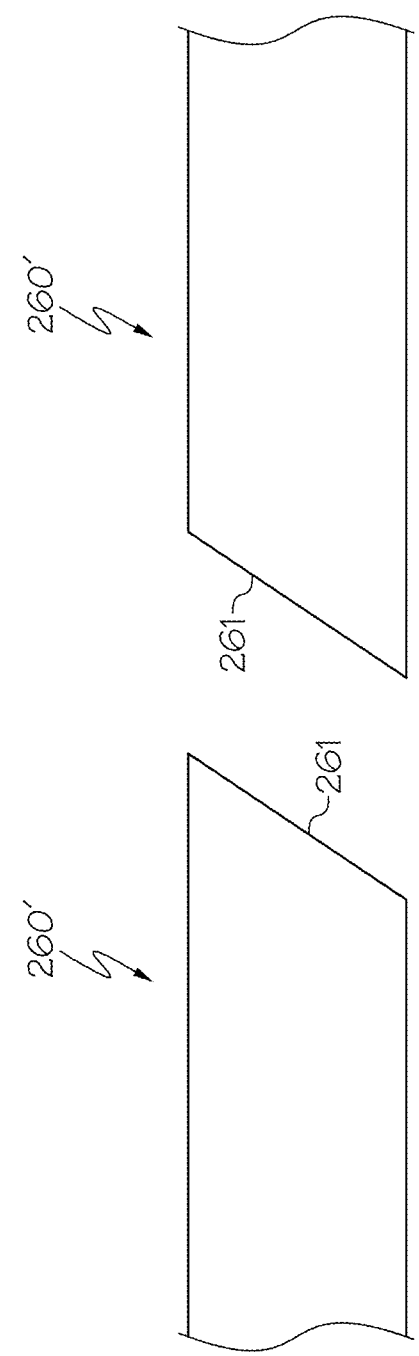

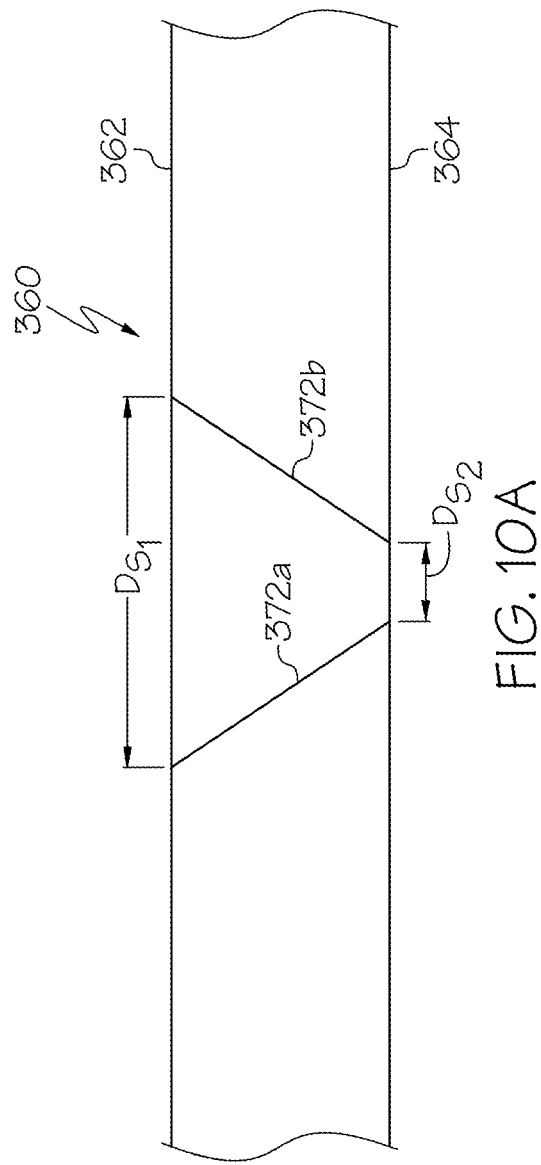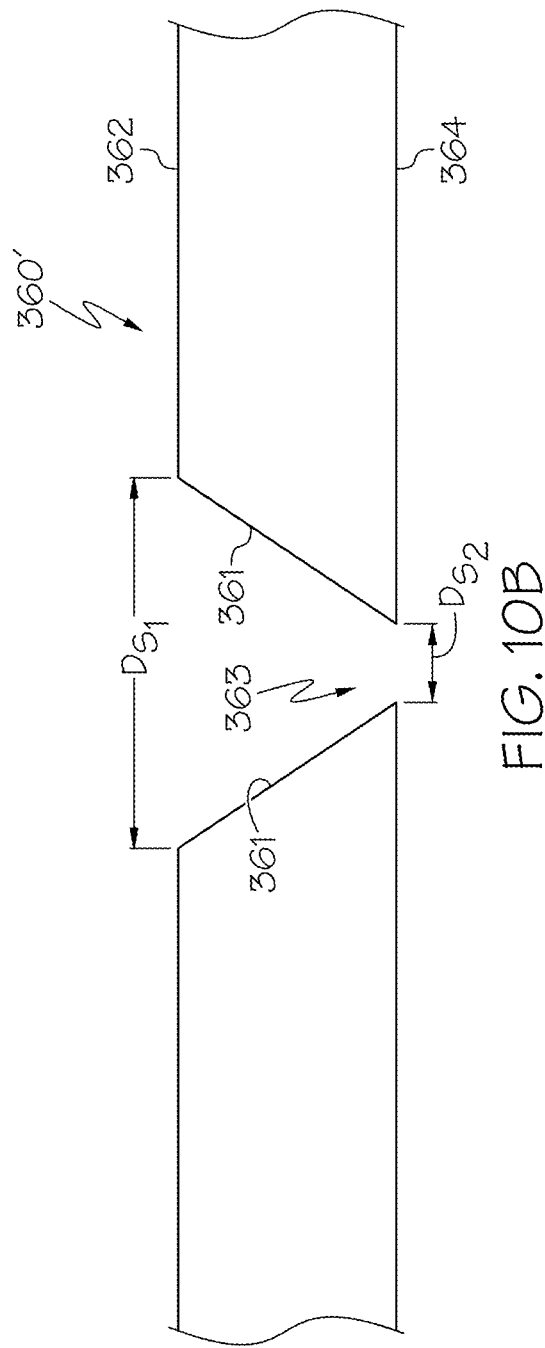

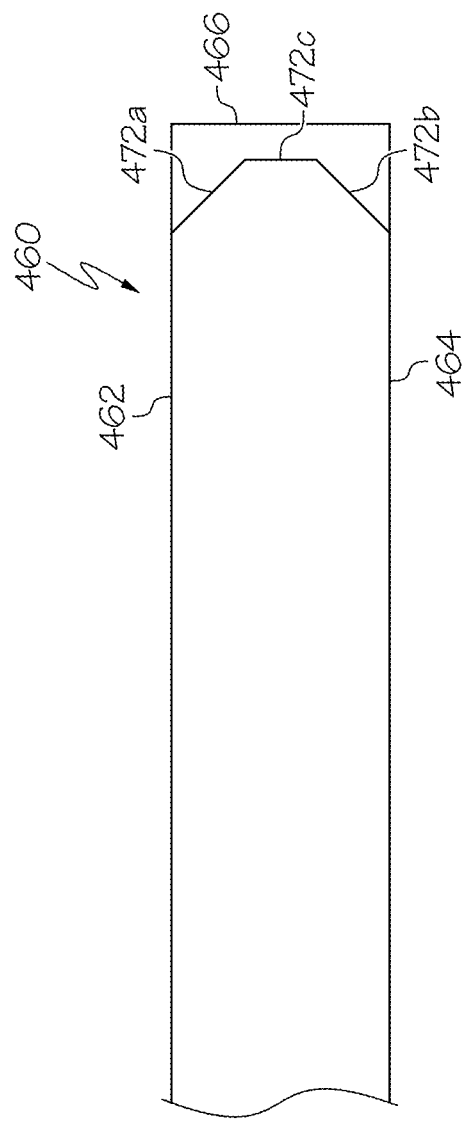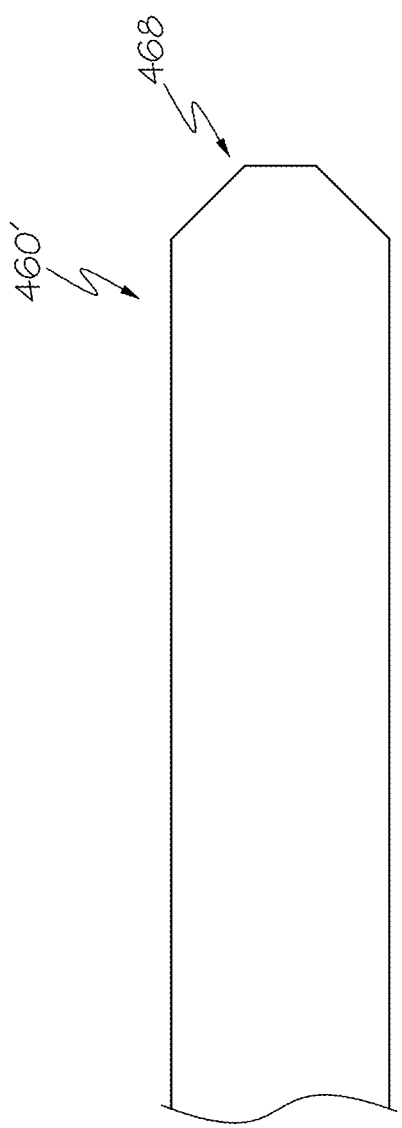

PHASE-MODIFIED QUASI-NON-DIFFRACTING LASER BEAMS FOR HIGH ANGLE LASER PROCESSING OF TRANSPARENT WORKPIECES

This Application claims priority under 35 USC § 119(e) from U.S. Provisional Patent Application Ser. No. 62/969,216, filed on Feb. 3, 2020, and which is incorporated by reference herein in its entirety.

BACKGROUND

Field

The present specification generally relates to apparatuses and methods for laser processing transparent workpieces, and more particularly, to laser beams comprising laser beam focal lines that are quasi-non-diffracting and retain a quasi-non-diffracting character when directed into a transparent workpiece at a non-normal angle of incidence.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Many methods of separating glass substrates result in square separated edges that are prone to breakage and are often processed to have bevels or to be rounded to minimize the chance of breakage. Currently, the non-square edges are often accomplished using mechanical means, such as mechanical grinding and polishing. However, the processes generate glass dust and particles, which must be cleaned by additional process steps involving washing or chemical treatments. Accordingly, a need exists for alternative improved methods for separating glass substrates which replace the conventional edge finishing process with a particle free and high throughput process.

SUMMARY

According to one embodiment of the present disclosure, a method for processing a transparent workpiece includes directing a laser beam oriented along a beam pathway into an impingement surface of the transparent workpiece at an impingement location. A portion of the laser beam directed into the transparent workpiece is a laser beam focal line and generates an induced absorption to produce a defect within the transparent workpiece. The laser beam focal line includes a wavelength $\lambda$, a spot size $w_o$, a Rayleigh range $Z_R$ that is greater than $$F_D \frac{\pi w_o^2}{\lambda},$$

where $F_D$ is a dimensionless divergence factor comprising a value of 10 or greater, and an internal focal line angle of greater than 10° relative to a plane orthogonal to the impingement surface at the impingement location, such that the defect has a defect angle within the transparent workpiece of greater than 10° relative to a plane orthogonal to the impingement surface at the impingement location. The laser beam focal line further includes a circular angular spectrum within the transparent workpiece; and a plurality of rays. Each individual ray of the plurality of rays has a same phase, $\phi$, when converging to form the circular angular spectrum within the transparent workpiece.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 9A schematically depicts a side view of a transparent workpiece having a contour of angled defects, according to one or more embodiments described herein;

FIG. 9B schematically depicts a side view of two separated articles formed from the transparent workpiece of FIG. 9A, each separated article comprising an angled edge, according to one or more embodiments shown and described herein;

FIG. 10A schematically depicts a side view of a transparent workpiece having a closed curved contour of angled defects, according to one or more embodiments described herein;

FIG. 10B schematically depicts a side view of a separated article formed from the transparent workpiece of FIG. 10A, the separated article comprising a conical hole with an angled edge, according to one or more embodiments shown and described herein;

FIG. 11A schematically depicts a side view of a transparent workpiece having a contour of defects extending from an impingement surface to an edge surface and a contour of defects extending from an opposite surface to an edge surface, according to one or more embodiments shown and described herein;

FIG. 11B schematically depicts a side view of a separated article formed from the transparent workpiece of FIG. 11A, the separated article comprising a beveled edge, according to one or more embodiments shown and described herein;

DETAILED DESCRIPTION

Figure 1A:
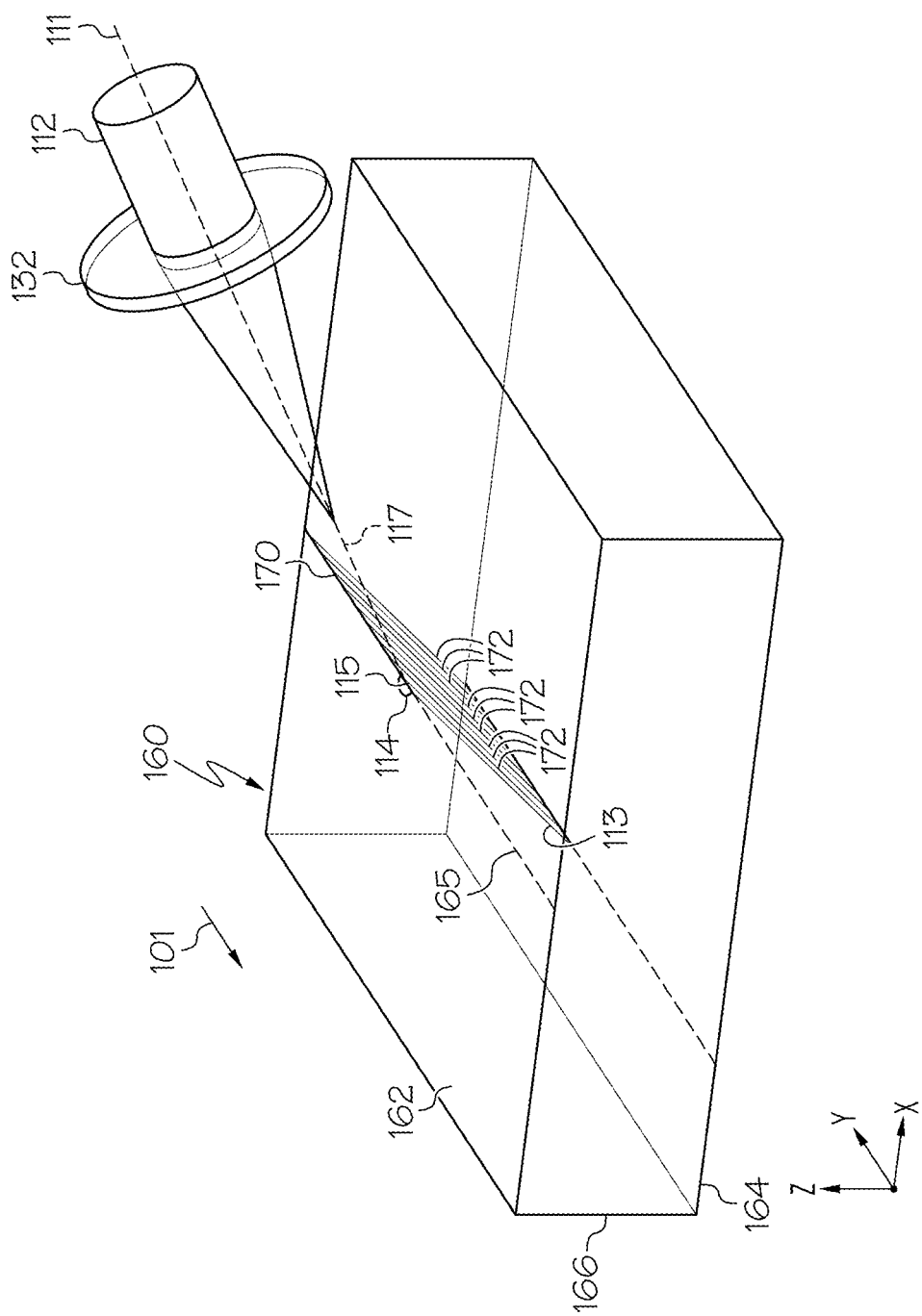
FIG. 1A schematically depicts a perspective view of an embodiment of laser forming a contour of defects, each having a defect angle, in a transparent workpiece, according to one or more embodiments described herein.

Reference will now be made in detail to embodiments of processes for laser processing transparent workpieces, such as glass workpieces, examples of which are illustrated in the accompanying drawings. Whenever possible, the same reference numerals will be used throughout the drawings to refer to the same or like parts.

According to one or more embodiments described herein, a transparent workpiece may be laser processed to form a contour in the transparent workpiece that comprises a series of defects along a line of intended separation for separating the transparent workpiece into two or more separated articles. Each of the defects comprise a defect angle of greater than 10 such that, after separation of the transparent workpiece along the contour, the resultant separated articles comprise an angled edge having an edge angle of greater than 10°. Defects may be formed in a transparent workpiece using a low diffracting beam, such as a quasi-non-diffracting beam, focused into a laser beam focal line.

Using current methods, diffraction and divergence of extended focus laser beams (e.g., quasi-non-diffracting beams) increases when the beam is directed into the transparent workpiece at increased angles relative to normal incidence (e.g., angles greater than 10° from normal incidence) and as such, it is difficult to form a series of high angle defects to facilitate the separation of transparent workpieces into separated articles having angled edges. For example, using previous laser processing techniques, when a laser beam enters a transparent workpiece with an angled, curved, or stepped face, aberrations are introduced into the beam. For Bessel beams, these aberrations result in a large decrease of peak beam intensity as the beam travels inside the transparent workpiece, diminishing the quality or even preventing the formation of high angle defects. While not intending to be limited by theory, peak beam intensity decreases because, in conventional angled cutting, the central lobe of a standard Bessel beam splits into multiple lobes and thus the peak intensity of any of the split lobes is less than the peak intensity of the central lobe of a non-aberrated Bessel beam. While still not intending to be limited by theory, aberrations also lead to a decrease in the Rayleigh range of the beam. Thus, improved methods of laser processing transparent workpieces are desired. Accordingly, the methods described herein use angled laser beam focal lines that are phase altered such that the laser beam focal lines exhibit minimal divergence along the length of the laser beam focal line within the transparent workpiece to form a contour of high angled defects and facilitate the formation of separated articles having angled edges. The methods are described herein with specific references to the appended drawings.

As used herein, "laser processing" comprises directing a laser beam onto and/or into a transparent workpiece. In some embodiments, laser processing further comprises translating the laser beam relative to the transparent workpiece or translating the transparent workpiece relative to the laser beam, for example, along a contour line or other pathway. Examples of laser processing include using a laser beam to form a contour comprising a series of defects that extend into the transparent workpiece and/or using an infrared laser beam to heat the transparent workpiece. Laser processing may separate the transparent workpiece along one or more desired lines of separation. However, in some embodiments, additional non-laser steps, such as applying mechanical force, may be utilized to separate the transparent workpiece along one or more desired lines of separation.

As used herein, the "angular spectrum" of a laser beam refers to the distribution of the Fourier spectrum of the laser beam in the spatial frequency domain. In particular, the angular spectrum represents a group of plane waves whose summation recreates the original beam. The angular spectrum may also be referred to as the spatial-frequency distribution of the laser beam.

As used herein, "beam spot" refers to a cross section of a laser beam (e.g., a beam cross section) at the impingement location of the laser beam at an impingement surface of a transparent workpiece, i.e., the surface of a transparent workpiece upon which the laser beam is first incident. The beam spot is the cross-section at the impingement location. In the embodiments described herein, the beam spot is sometimes referred to as being "axisymmetric" or "non-axisymmetric." As used herein, axisymmetric refers to a shape that is symmetric, or appears the same, for any arbitrary rotation angle made about a central axis, and "non-axisymmetric" refers to a shape that is not symmetric for any arbitrary rotation angle made about a central axis. The rotation axis (e.g., the central axis) is most often taken as being the optical axis (axis of propagation) of the laser beam, which is the axis extending in the beam propagation direction, which is referred to herein as the z-direction.

As used herein, "upstream" and "downstream" refer to the relative position of two locations or components along a beam pathway with respect to a beam source. For example, a first component is upstream from a second component if the first component is closer to the beam source along the path traversed by the laser beam than the second component and a first position (location) is upstream from a second position (location) if the first position (location) is closer to the beam source along the path traversed by the laser beam than the second position (location).

As used herein, "laser beam focal line," refers to a pattern of interacting (e.g., crossing) light rays of a laser beam that forms a focal region elongated in the beam propagation direction. In conventional laser processing, a laser beam is tightly focused to a focal point. The focal point is the point of maximum intensity of the laser beam and is situated at a focal plane in a transparent workpiece. In the elongated focal region of a focal line, in contrast, the region of maximum intensity of the laser beam extends beyond a point to a line aligned with the beam propagation direction. A focal line is formed by converging light rays that intersect (e.g., cross) to form a continuous series of focal points aligned with the beam propagation direction. The laser beam focal lines described herein are formed using a quasi-non-diffracting beam, mathematically defined in detail below.

As used herein, "contour line," corresponds to the set of intersection points of the laser beam with the incident (impingement) surface of the transparent workpiece resulting from relative motion of the laser beam and the transparent workpiece. A contour line can be linear, angled, polygonal or curved in shape. A contour line can be closed (i.e. defining an enclosed region on the surface of the transparent workpiece) or open (i.e. not defining an enclosed region on the surface of the transparent workpiece). The contour line represents a boundary along which separation of the transparent workpiece into two or more parts is facilitated. Separation occurs spontaneously or with the assistance of external thermal or mechanical energy.

As used herein, "contour," refers to a set of defects in a transparent workpiece formed by a laser beam through relative motion of a laser beam and the transparent workpiece along a contour line. The defects are spaced apart along the contour line and are wholly contained within the interior of the transparent workpiece and/or extend through one or more surfaces into the interior of the transparent workpiece. Defects may also extend through the entire thickness of the transparent workpiece. Separation of the transparent workpiece occurs by connecting defects along the contour, such as, for example, through propagation of a crack.

As used herein, a "defect" refers to a region of a transparent workpiece that has been modified by a laser beam focal line. Defects include regions of a transparent workpiece having a modified refractive index relative to surrounding unmodified regions of the transparent workpiece. Common defects include structurally modified regions such as void spaces, cracks, scratches, flaws, holes, perforations, densifications, or other deformities in the transparent workpiece produced by a laser beam focal line. Defects may also be referred to, in various embodiments herein, as defect lines or damage tracks. A defect or damage track is formed through interaction of a laser beam focal line with the transparent workpiece. As described more fully below, the laser beam focal line is produced by a pulsed laser. A defect at a particular location along the contour line is formed from a focal line produced by a single laser pulse at the particular location, by a pulse burst of sub-pulses at the particular location, or by multiple laser pulses at the particular location. Relative motion of the laser beam and transparent workpiece along the contour line results in multiple defects that form a contour.

The phrase "transparent workpiece," as used herein, means a workpiece formed from glass, glass-ceramic or other material which is transparent, where the term "transparent," as used herein, means that the workpiece has a linear optical absorption of less than 20% per mm of material depth for the specified pulsed laser wavelength. In embodiments, the transparent workpiece has a linear optical absorption less than 10% per mm of material depth for the specified pulsed laser wavelength, or such as less than 1% per mm of material depth for the specified pulsed laser wavelength. Unless otherwise specified, the transparent workpiece has a linear optical absorption of less than about 20% per mm of material depth. The transparent workpiece may have a depth (e.g., thickness) of from about 50 microns (μm) to about 10 mm (such as from about 100 μm to about 5 mm, or from about 0.5 mm to about 3 mm). Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments the transparent workpiece may be strengthened via thermal tempering before or after laser processing the transparent workpiece. In some embodiments, the glass may be ion-exchangeable or ion exchanged, such that the glass composition can undergo ion-exchange or has undergone ion-exchange for glass strengthening before or after laser processing the transparent workpiece. For example, the transparent workpiece may comprise ion exchanged or ion exchangeable glass, such as Corning Gorilla® Glass available from Corning Incorporated of Corning, N.Y. (e.g., code 2318, code 2319, and code 2320). Further, these ion exchangeable or ion exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, N.Y. Moreover, the transparent workpiece may comprise other components which are transparent to the wavelength of the laser, for example, glass ceramics or crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+ (when present in the glass), Na+, K+, Rb+, and Cs+. Alternatively, monovalent cations in the surface layer may be replaced with monovalent cations other than alkali metal cations, such as Ag+, Tl+, Cu+, or the like.

As used herein, the term "quasi-non-diffracting beam" is used to describe a laser beam having low beam divergence as mathematically described below. In particular, the laser beam used to form a contour of defects in the embodiments described herein. The laser beam has an intensity distribution I(X, Y, Z), where Z is the beam propagation direction of the laser beam, and X and Y are directions orthogonal to the beam propagation direction, as depicted in the figures. The X-direction and Y-direction may also be referred to as cross-sectional directions and the X-Y plane may be referred to as a cross-sectional plane. The coordinates and directions X, Y, and Z are also referred to herein as x, y, and z; respectively. The intensity distribution of the laser beam in a cross-sectional plane may be referred to as a cross-sectional intensity distribution.

The quasi-non-diffracting laser beam may be formed by impinging a diffracting laser beam (such as a Gaussian beam) into, onto, and/or thorough a phase-altering optical element, such as an adaptive phase-altering optical element (e.g., a spatial light modulator, an adaptive phase plate, a deformable mirror, or the like), a static phase-altering optical element (e.g., a static phase plate, an aspheric optical element, such as an axicon, or the like), to modify the phase of the beam, to reduce beam divergence, and to increase Rayleigh range, as mathematically defined below. Example quasi-non-diffracting beams include Gauss-Bessel beams, Airy beams, Weber beams, and Bessel beams. Furthermore, optical assemblies that include a phase-altering optical element are described in more detail below.

Without intending to be limited by theory, beam divergence refers to the rate of enlargement of the beam cross section in the direction of beam propagation (i.e., the Z direction). One example of a beam cross section discussed herein is a beam spot 114 of a laser beam 112 projected onto a transparent workpiece 160 (FIG. 1A). Diffraction is one factor that leads to divergence of laser beams. Other factors include focusing or defocusing caused by the optical systems forming the laser beams or refraction and scattering at interfaces. Laser beams for forming the defects of the contours are formed from laser beam focal lines. Laser beam focal lines have low divergence and weak diffraction. The divergence of the laser beam is characterized by the Rayleigh range $Z_R$, which is related to the variance $\sigma^2$ of the intensity distribution and beam propagation factor $M^2$ of the laser beam. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment-Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment-Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the laser beam having a time-averaged intensity profile I(x, y, z) are given by the following expressions:

$$\overline{x}(z) = \frac{\int_{-\infty}^{\infty}\int_{-\infty}^{\infty} xI(x, y, z)dxdy}{\int_{-\infty}^{\infty}\int_{-\infty}^{\infty} I(x, y, z)dxdy} \quad (1)$$

$$\overline{y}(z) = \frac{\int_{-\infty}^{\infty}\int_{-\infty}^{\infty} yI(x, y, z)dxdy}{\int_{-\infty}^{\infty}\int_{-\infty}^{\infty} I(x, y, z)dxdy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the laser beam as a function of position z in the direction of beam propagation (Z-direction). For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent variances in the X-direction and Y-direction, respectively, in the far field limit. For a laser beam having a time-averaged intensity profile I(x, y, z) with Fourier transform $\tilde{I}(v_x, v_y)$ (where $v_x$ and $v_y$ are spatial frequencies in the X-direction and Y-direction, respectively), the near field and far field variances in the X-direction and Y-direction are given by the following expressions:

$$\sigma_{0x}^2(z) = \frac{\int_{-\infty}^{\infty}\int_{-\infty}^{\infty} x^2 I(x, y, z)dxdy}{\int_{-\infty}^{\infty}\int_{-\infty}^{\infty} I(x, y, z)dxdy} \quad (3)$$

$$\sigma_{0y}^2(z) = \frac{\int_{-\infty}^{\infty}\int_{-\infty}^{\infty} y^2 I(x, y, z)dxdy}{\int_{-\infty}^{\infty}\int_{-\infty}^{\infty} I(x, y, z)dxdy} \quad (4)$$

$$\sigma_{\infty x}^2 = \frac{\int_{-\infty}^{\infty}\int_{-\infty}^{\infty} v_x^2 \tilde{I}(v_x, v_y)dv_x dv_y}{\int_{-\infty}^{\infty}\int_{-\infty}^{\infty} \tilde{I}(v_x, v_y)dv_x dv_y} \quad (5)$$

$$\sigma_{\infty y}^2 = \frac{\int_{-\infty}^{\infty}\int_{-\infty}^{\infty} v_y^2 \tilde{I}(v_x, v_y)dv_x dv_y}{\int_{-\infty}^{\infty}\int_{-\infty}^{\infty} \tilde{I}(v_x, v_y)dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x, y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile $\tilde{u}(x, y, z)$ for an arbitrary optical beam (where $I(x, y, z) \equiv |\tilde{u}(x, y, z)|^2$) and the angular spectrum (often referred to as the spatial frequency distribution) $\tilde{P}(v_x, v_y, z)$ for an arbitrary optical beam (where $\tilde{I}(v_x, v_y) \equiv |\tilde{P}(v_x, v_y, z)|^2$), it can be shown that:

$$\sigma_x^2(z) = \sigma_{0x}^2(z_{0x}) + \lambda^2 \sigma_{\infty x}^2 (z-z_{0x})^2 \quad (7)$$

$$\sigma_y^2(z) = \sigma_{0y}^2(z_{0y}) + \lambda^2 \sigma_{\infty y}^2 (z-z_{0y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and $\lambda$ is the wavelength of the laser beam. Equations (7) and (8) indicate that $\sigma_x^2(z)$ and $\sigma_y^2(z)$ increase quadratically with z in either direction from the minimum values associated with the waist position of the laser beam (e.g., the waist portion of the laser beam focal line). Further, in the embodiments described herein comprising a beam spot 114 that is axisymmetric and thereby comprises an axisymmetric intensity distribution I(x,y), $\sigma_{0x}^2(z) = \sigma_y^2(z)$ and in the embodiments described herein comprising a beam spot 114 that is non-axisymmetric and thereby comprises a non-axisymmetric intensity distribution I(x,y), $\sigma_{0x}(z) \neq \sigma_y^2(z)$, i.e., $\sigma_x^2(z) < \sigma_y^2(z)$ or $\sigma_x^2(z) > \sigma_y^2(z)$.

Equations (7) and (8) can be rewritten in terms of a beam propagation factor $M^2$, where separate beam propagations factors $M_x^2$ and $M_y^2$ for the x-direction and the y-direction are defined as:

$$M_x^2 = 4\pi\sigma_{0x}\sigma_{\infty x} \quad (9)$$

$$M_y^2 = 4\pi\sigma_{0y}\sigma_{\infty y} \quad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z-z_{0x})^2 \quad (11)$$

$$\sigma_y^2(z) = \sigma_{0y}^2(z_{0y}) + \frac{\lambda^2 M_y^4}{(4\pi\sigma_{0y})^2}(z-z_{0y})^2 \quad (12)$$

which can be rewritten as:

$$\sigma_x^2(z) = \sigma_{0x}^2(z_{0x})\left[1 + \frac{(z-z_{0x})^2}{Z_{Rx}^2}\right] \quad (13)$$

$$\sigma_y^2(z) = \sigma_{0y}^2(z_{0y})\left[1 + \frac{(z-z_{0y})^2}{Z_{Ry}^2}\right] \quad (14)$$

where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2 \lambda} \quad (15)$$

$$Z_{Ry} = \frac{4\pi\sigma_{0y}^2}{M_y^2 \lambda} \quad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross-sectional area of the laser beam. Further, in the embodiments described herein comprising a beam spot 114 that is axisymmetric and thereby comprises an axisymmetric intensity distribution I(x,y), $Z_{Rx} = Z_{Ry}$ and in the embodiments described herein comprising a beam spot 114 that is non-axisymmetric and thereby comprises a non-axisymmetric intensity distribution I(x,y), $Z_{Rx} \neq Z_{Ry}$, i.e., $Z_{Rx} < Z_{Ry}$ or $Z_{Rx} > Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges.

The formulas above can be applied to any laser beam (not just Gaussian beams) by using the intensity profile I(x, y, z) that describes the laser beam. In the case of the $TEM_{00}$ mode of a Gaussian beam, the intensity profile is given by:

$$I(x, y) = \frac{\sqrt{\pi}}{2} w_o e^{\frac{-2(x^2+y^2)}{w_o^2}} \quad (17)$$

where $w_o$ is the radius (defined as the radius at which beam intensity decreases to $1/e^2$ of the peak beam intensity of the beam at a beam waist position $z_o$. From Equation (17) and the above formulas, we obtain the following results for a $TEM_{00}$ Gaussian beam:

$$\sigma_{0x}^2 = \sigma_{0y}^2 = \frac{w_o^2}{4} \quad (18)$$

$$\sigma_{\infty x}^2 = \sigma_{\infty y}^2 = \frac{1}{4\pi^2 w_o^2} \quad (19)$$

$$M_x^2 = 4\pi\sigma_{0x}\sigma_{\infty x} = 1 \quad (20)$$

$$M_y^2 = 4\pi\sigma_{0y}\sigma_{\infty y} = 1 \quad (21)$$

$$Z_{Rx} = \frac{4\pi\sigma_{0x}^2}{M_x^2 \lambda} = \frac{\pi w_0^2}{\lambda} \quad (22)$$

$$Z_{Ry} = \frac{4\pi\sigma_{0y}^2}{M_y^2 \lambda} = \frac{\pi w_0^2}{\lambda} \quad (23)$$

$$w^2(z) = w_0^2 + \frac{\lambda^2}{(\pi w_0)^2}(z-z_0)^2 = w_0^2\left[1 + \frac{(z-z_0)^2}{Z_R^2}\right] \quad (24)$$

where $Z_R = Z_{Rx} = Z_{Ry}$. For Gaussian beams, it is further noted that $M^2 = M_x^2 = M_y^2 = 1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_0$. The maximum intensity of a Gaussian beam occurs at the center ($x=0$ and $y=0$ (Cartesian) or $r=0$ (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (17) shows that spot size is equal to $w_o$, which from Equation (18) corresponds to $2\sigma_{0x}$ or $2\sigma_{0y}$. For an axisymmetric beam having an axisymmetric cross section, such as a circular cross section, $\sigma_{0x}=\sigma_{0y}$. Thus, for axisymmetric beams, the cross section dimension may be characterized with a single spot size parameter, where $w_o=2\sigma_0$. Spot size can be similarly defined for non-axisymmetric beam cross sections where, unlike an axisymmetric beam, $\sigma_{0x} \neq \sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$ in the x-direction and y-direction, respectively, where $$w_{ox}=2\sigma_{0x} \quad (25)$$

$$w_{oy}=2\sigma_{0y} \quad (26)$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the X-axis and Y-axis. ISO 11146-1:2005(E) refers to these reference axes as the principal axes of the power density distribution (Section 3.3-3.5) and in the following discussion we will assume that the X and Y axes are aligned with these principal axes. Further, an angle $\phi$ about which the X-axis and Y-axis may be rotated in the cross-sectional plane (e.g., an angle of the X-axis and Y-axis relative to reference positions for the X-axis and Y-axis, respectively) may be used to define minimum ($w_{o,min}$) and maximum values ($w_{o,max}$) of the spot size parameters for a non-axisymmetric beam:

$$w_{o,min}=2\sigma_{0,min} \quad (27)$$

$$w_{o,max}=2\sigma_{0,max} \quad (28)$$

where $2\sigma_{0,min}=2\sigma_{0x}(\phi_{min,x})=2\sigma_{0y}(\phi_{min,y})$ and $2\sigma_{0,max}=2\sigma_{0x}(\phi_{max,x}) 2\sigma_{0y}(\phi_{max,y})$ The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, or the like To promote uniformity of defects in a transparent workpiece along the beam propagation direction (e.g. depth dimension of the transparent workpiece), a laser beam having low divergence may be used. In one or more embodiments, laser beams having low divergence may be utilized for forming defects. As noted above, divergence can be characterized by the Rayleigh range. For non-axisymmetric beams, Rayleigh ranges for the principal axes X and Y are defined by Equations (15) and (16) for the X-direction and Y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam. For symmetric beams, Rayleigh range is the same in the X-direction and Y-direction and is expressed by Equation (22) or Equation (23). Low divergence correlates with large values of the Rayleigh range and weak diffraction of the laser beam.

Beams with Gaussian intensity profiles may be less preferred for laser processing to form defects because, when focused to the small enough spot sizes (such as spot sizes in the range of microns, such as about 1-5 μm or about 1-10 μm) needed to achieve laser pulse energies sufficient to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{R_y}$ will accordingly vary, and each will have a minimum value and a maximum value that correspond to the principal axes, with the minimum value of $Z_{R_x}$ being denoted as $Z_{Rx,min}$ and the minimum value of of $Z_{R_y}$ being denoted $Z_{Ry,min}$ for an arbitrary beam profile $Z_{Rx,min}$ and $Z_{Ry,min}$ can be shown to be given by $$Z_{Rx,min} = \frac{4\pi\sigma_{0,min}^2}{M_x^2 \lambda} \quad (29)$$

and $$Z_{Ry,min} = \frac{4\pi\sigma_{0,min}^2}{M_y^2 \lambda} \quad (30)$$

Since divergence of the laser beam occurs over a shorter distance in the direction having the smallest Rayleigh range, the intensity distribution of the laser beam used to form defects may be controlled so that the minimum values of $Z_{Rx}$ and $Z_{Ry}$ (or for axisymmetric beams, the value of $Z_R$) are as large as possible. Since the minimum value $Z_{Rx,min}$ of $Z_{Rx}$ and the minimum value $Z_{Ry,min}$ of $Z_{Ry}$ differ for a non-axisymmetric beam, a laser beam 112 may be used with an intensity distribution that makes the smaller of $Z_{Rx,min}$ and $Z_{Ry,min}$ as large as possible when forming damage regions.

In different embodiments, the smaller of $Z_{Rx,min}$ and $Z_{Ry,min}$ (or for axisymmetric beams, the value of $Z_R$) is greater than or equal to 50 µm, greater than or equal to 100 µm, greater than or equal to 200 µm, greater than or equal to 300 µm, greater than or equal to 500 µm, greater than or equal to 1 mm, greater than or equal to 2 mm, greater than or equal to 3 mm, greater than or equal to 5 mm, in the range from 50 µm to 10 mm, in the range from 100 µm to 5 mm, in the range from 200 µm to 4 mm, in the range from 300 µm to 2 mm, or the like.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (27). In different embodiments, the spot size parameter $w_{o,min}$ is greater than or equal to 0.25 µm, greater than or equal to 0.50 µm, greater than or equal to 0.75 µm, greater than or equal to 1.0 µm, greater than or equal to 2.0 µm, greater than or equal to 3.0 µm, greater than or equal to 5.0 µm, in the range from 0.25 µm to 10 µm, in the range from 0.25 µm to 5.0 µm, in the range from 0.25 µm to 2.5 µm, in the range from 0.50 µm to 10 µm, in the range from 0.50 µm to 5.0 µm, in the range from 0.50 µm to 2.5 µm, in the range from 0.75 µm to 10 µm, in the range from 0.75 µm to 5.0 µm, in the range from 0.75 µm to 2.5 µm, or the like.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size w for axisymmetric beams can be specified as non-diffracting or quasi non-diffracting beams for forming damage regions using equation (31) for non-axisymmetric beams of equation (32) for axisymmetric beams, below:

$$\text{Smaller of } Z_{Rx,min}, Z_{Ry,min} > F_D \frac{\pi w_{0,eff}^2}{\lambda} \quad (31)$$

$$Z_R > F_D \frac{\pi w_0^2}{\lambda} \quad (32)$$

where $F_D$ is a dimensionless divergence factor having a value of at least 10, at least 50, at least 100, at least 250, at least 500, at least 1000, in the range from about 10 to about 2000, in the range from about 50 to about 1500, in the range from about 100 to about 1000. By comparing Equation (31) to Equation (22) or (23), one can see that for a non-diffracting or quasi non-diffracting beam the distance, Smaller of $Z_{Rx,min}$, $Z_{Ry,min}$ in Equation (31), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the laser beam 112 is considered quasi-non-diffracting if the characteristics of the laser beam satisfy Equation (31) or Equation (32) with a value of $F_D \geq 10$. As the value of $F_D$ increases, the laser beam 112 approaches a more nearly perfect non-diffracting state. Moreover, it should be understood that Equation (32) is merely a simplification of Equation (31) and as such, Equation (31) mathematically describes the dimensionless divergence factor $F_D$ for both axisymmetric and non-axisymmetric pulsed laser beams.

Figure 1B:
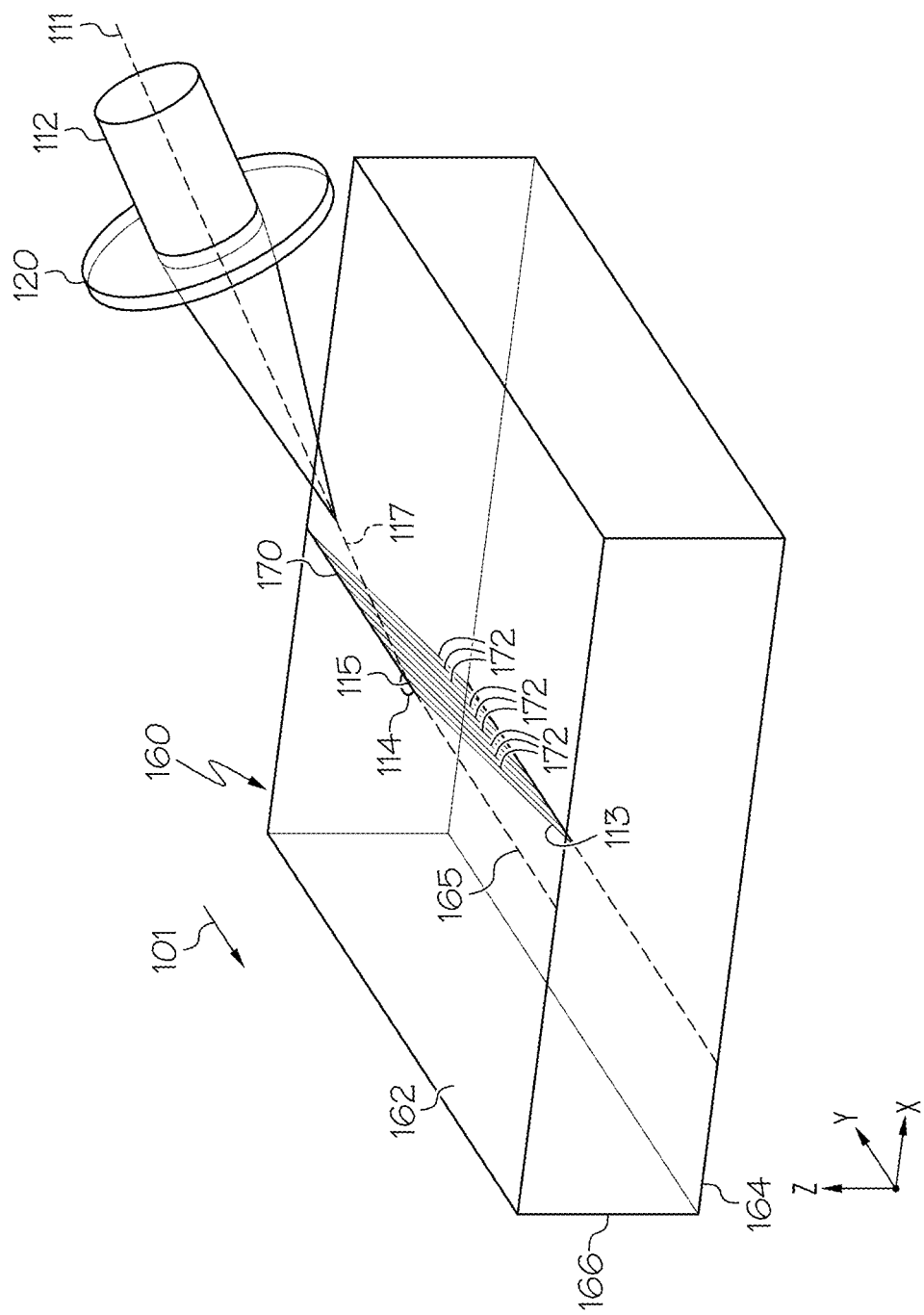
FIG. 1B schematically depicts a perspective view of another embodiment of laser forming a contour of defects, each having a defect angle, in a transparent workpiece, according to one or more embodiments described herein.
Figure 1C:
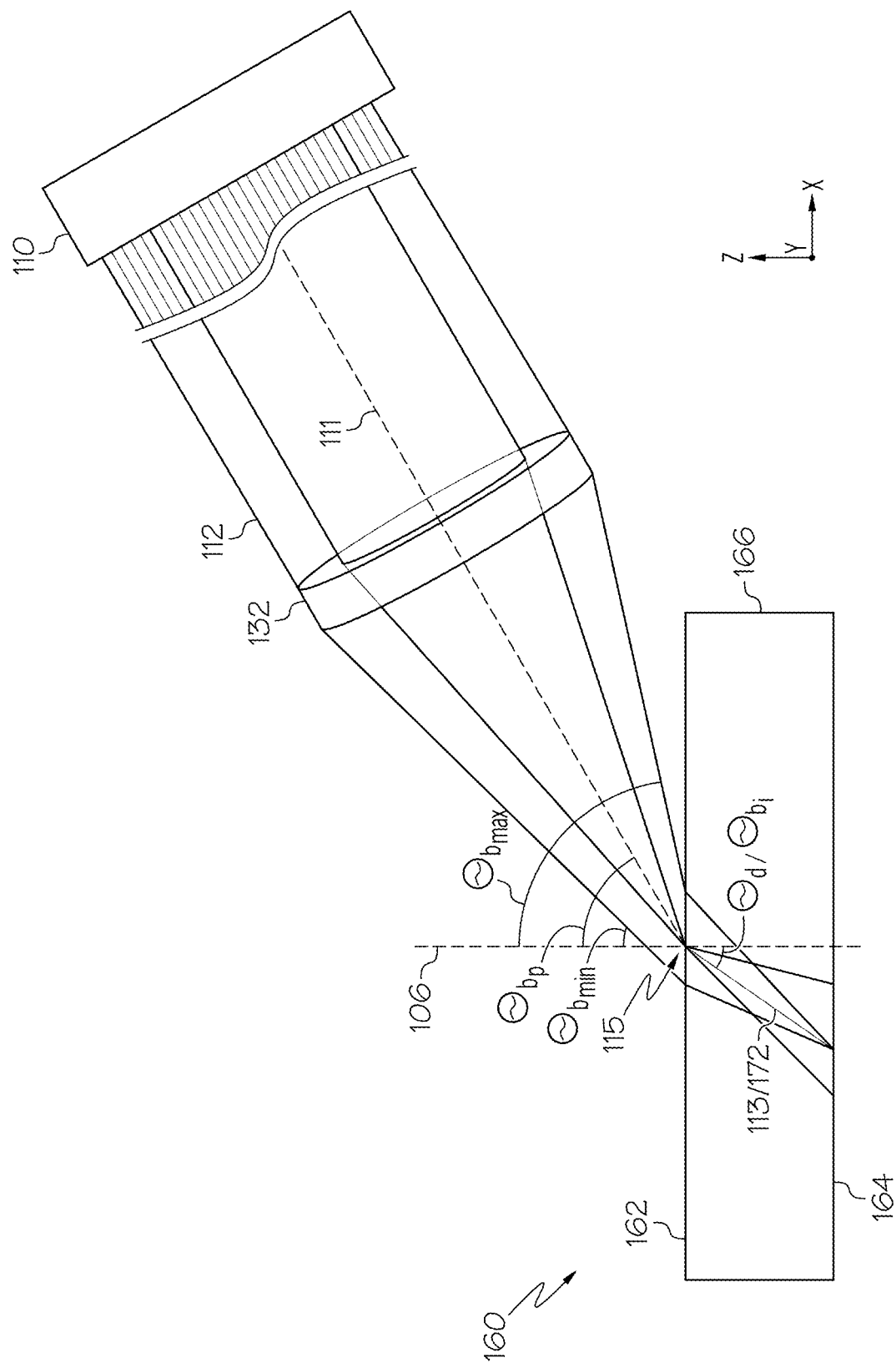
FIG. 1C schematically depicts a side view of an embodiment of laser forming the contour of defects, each having a defect angle, in the transparent workpiece, according to one or more embodiments described herein.

Referring now to FIGS. 1A-1C, an example transparent workpiece 160 is schematically depicted undergoing laser processing according to the methods described herein. In particular, FIGS. 1A-1C schematically depict directing a laser beam 112 that is output by a beam source 110, such as a Gaussian beam source, and oriented along a beam pathway 111 into the transparent workpiece 160 at a beam propagation angle $\theta_{bp}$ such that a portion of the laser beam 112 directed into the transparent workpiece 160 comprises a laser beam focal line 113 that is not orthogonal to an impingement surface 162 of the transparent workpiece 160 and instead comprises an internal beam angle $\theta_{bi}$. The laser beam 112 forms a beam spot 114 projected onto the impingement surface 162 of the transparent workpiece 160, which further comprises an opposite surface 164 and an edge surface 166 extending between the impingement surface 162 and the opposite surface 164.

The laser beam focal line 113 generates an induced absorption within the transparent workpiece 160 to produce a defect 172 within the transparent workpiece 160. Because the laser beam focal line 113 comprises an internal beam angle $\theta_{bi}$, the defect 172 formed by induced absorption comprises a defect angle $\theta_d$ equal to or about equal to the internal beam angle $\theta_{bi}$. In other words, the defects 172 formed in the embodiments described herein comprise angled defects, where "angled" refers to an angular deviation from the direction normal to the impingement surface 162 at impingement location 115. Laser beam focal line 113 is correspondingly angled. Moreover, the laser beam 112 is phase modified by a phase-altering optical element 120. When the laser beam 112 impinges the impingement surface 162 of the transparent workpiece 160 at a beam propagation angle $\theta_{bp}$, the laser beam 112 forms a laser beam focal line 113 having an internal beam angle $\theta_{bi}$. Furthermore, because of the phase modification applied by the phase-altering optical element 120, when the laser beam focal line 113 has an internal beam angle $\theta_{bi}$ greater than 10°, the laser beam focal line 113 exhibits quasi-non-diffracting character (as mathematically defined above in Eqs. (31) and (32)) within the transparent workpiece 160.

Referring now to FIG. 1C, each of the beam propagation angle $\theta_{bp}$, the internal beam angle $\theta_{bi}$, and the defect angle $\theta_d$ are measured relative to a plane orthogonal to the impingement surface 162 at an impingement location 115 (i.e., the orthogonal plane 106). The impingement location 115 is a specific location on the impingement surface 162 where the laser beam 112 is first incident to and initially contacts the impingement surface 162. When the laser beam 112 (including the laser beam focal line 113) and the transparent workpiece 160 are translated relative to one another, the impingement location 115 changes such that, when the impingement surface 162 comprises a variable topography, the orthogonal plane 106 may change. Further, the beam propagation angle $\theta_{bp}$ comprises the average angle of light rays of the laser beam 112 impinging the impingement surface 162 relative to the orthogonal plane 106. As shown in FIG. 1C, the laser beam 112 impinging the impingement surface 162 includes a maximum beam propagation angle $\theta_{bmax}$, which is the angle of the light rays of the laser beam 112 having the largest angle at the impingement surface 162 relative to the orthogonal plane 106, and a minimum beam propagation angle $\theta_{bmin}$, which is the angle of the light rays of the laser beam 112 having the smallest angle at the impingement surface 162 relative the orthogonal plane 106.

In some embodiments, as shown in FIGS. 1A and 1C, the laser beam 112 may be focused into the laser beam focal line 113 using a lens 132, which is an aspheric lens. In embodiments, the laser beam focal line 113 may further include a plurality of rays. Each individual ray of the plurality of rays may have the same phase, $\phi$, when converging to form the circular angular spectrum within the transparent workpiece. While a single lens 132 is depicted in FIGS. 1A and 1C, some embodiments may include a lens assembly 130 including a first lens 131 and a second lens 132, and repetitions thereof (FIGS. 2A and 2B) to focus the laser beam 112 into the laser beam focal line 113. Other standard optical elements (e.g. prisms, beam splitters etc.) may also be included in lens assembly 130. As depicted in FIG. 1C, the laser beam 112 may comprise an annular shape when impinging the lens 132. While the lens 132 is depicted focusing the laser beam 112 into the laser beam focal line 113 in FIG. 1A, other embodiments may use the phase-altering optical element 120, which modifies the phase of the laser beam 112, to also focus the laser beam 112 into the laser beam focal line 113, as depicted in FIG. 1B (i.e., to both phase modify and focus the laser beam 112). The laser beam focal line 113 may have a length in a range of from about 0.1 mm to about 100 mm or in a range of from about 0.1 mm to about 10 mm. Various embodiments may be configured to have a laser beam focal line 113 with a length 1 of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm.

Figures 8A, 8B:
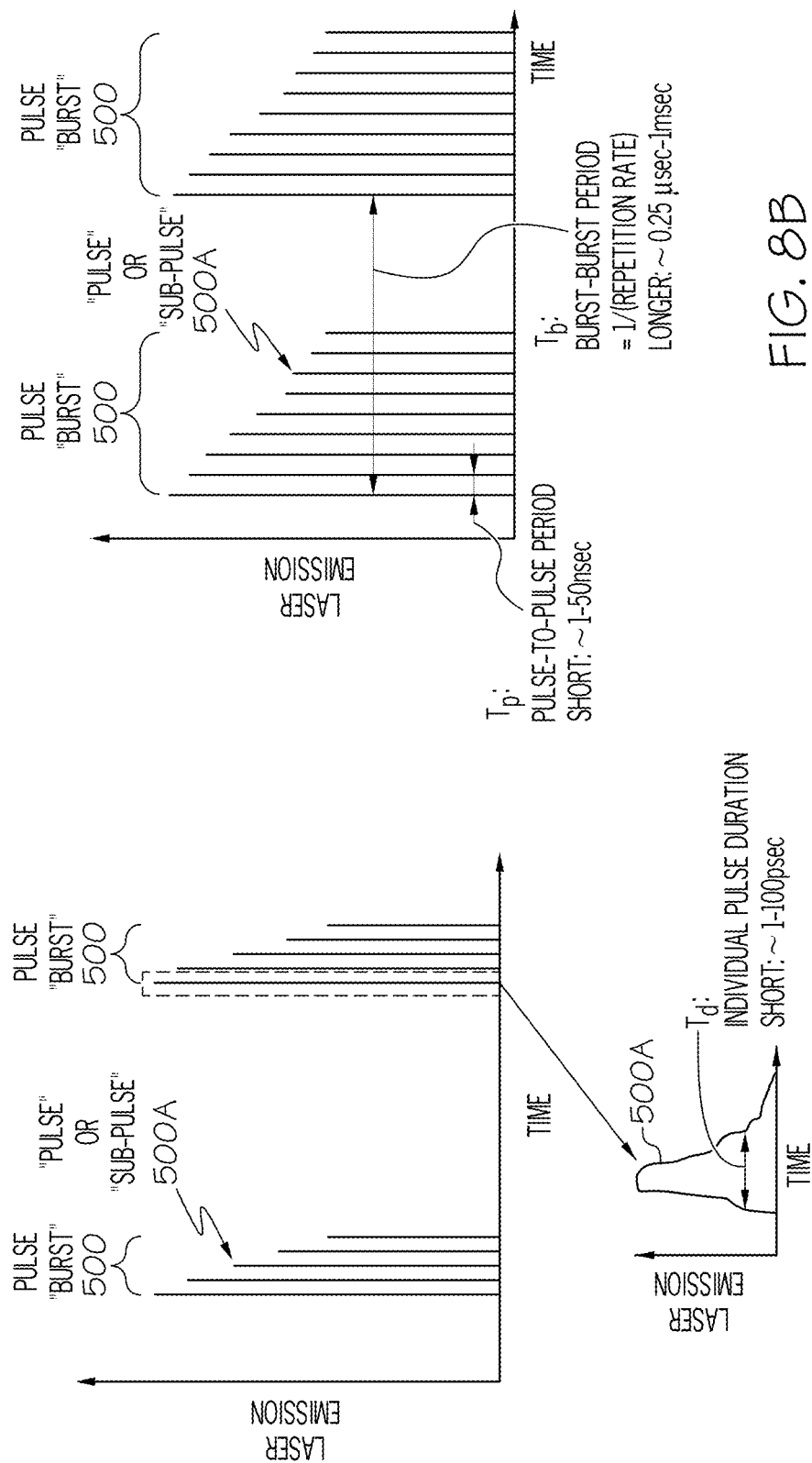
FIG. 8A graphically depicts the relative intensity of laser pulses within an exemplary pulse burst vs. time, according to one or more embodiments described herein.
FIG. 8B graphically depicts relative intensity of laser pulses vs. time within another exemplary pulse burst, according to one or more embodiments described herein.

In operation, the laser processing depicted in FIGS. 1A-1C further includes translating at least one of the laser beam focal line 113 and the transparent workpiece 160 relative to each other in a translation direction 101 along a contour line 165 (i.e., a line of desired separation) to form a plurality of defects 172. The plurality of defects 172 form a contour 170, which may be used to separate the transparent workpiece 160 into a plurality of separated articles 260', 360', 460' (FIGS. 8B, 9B, 10B). The defects 172 may extend, for example, through the depth (i.e., the thickness) of the transparent workpiece 160.

Figure 2A:
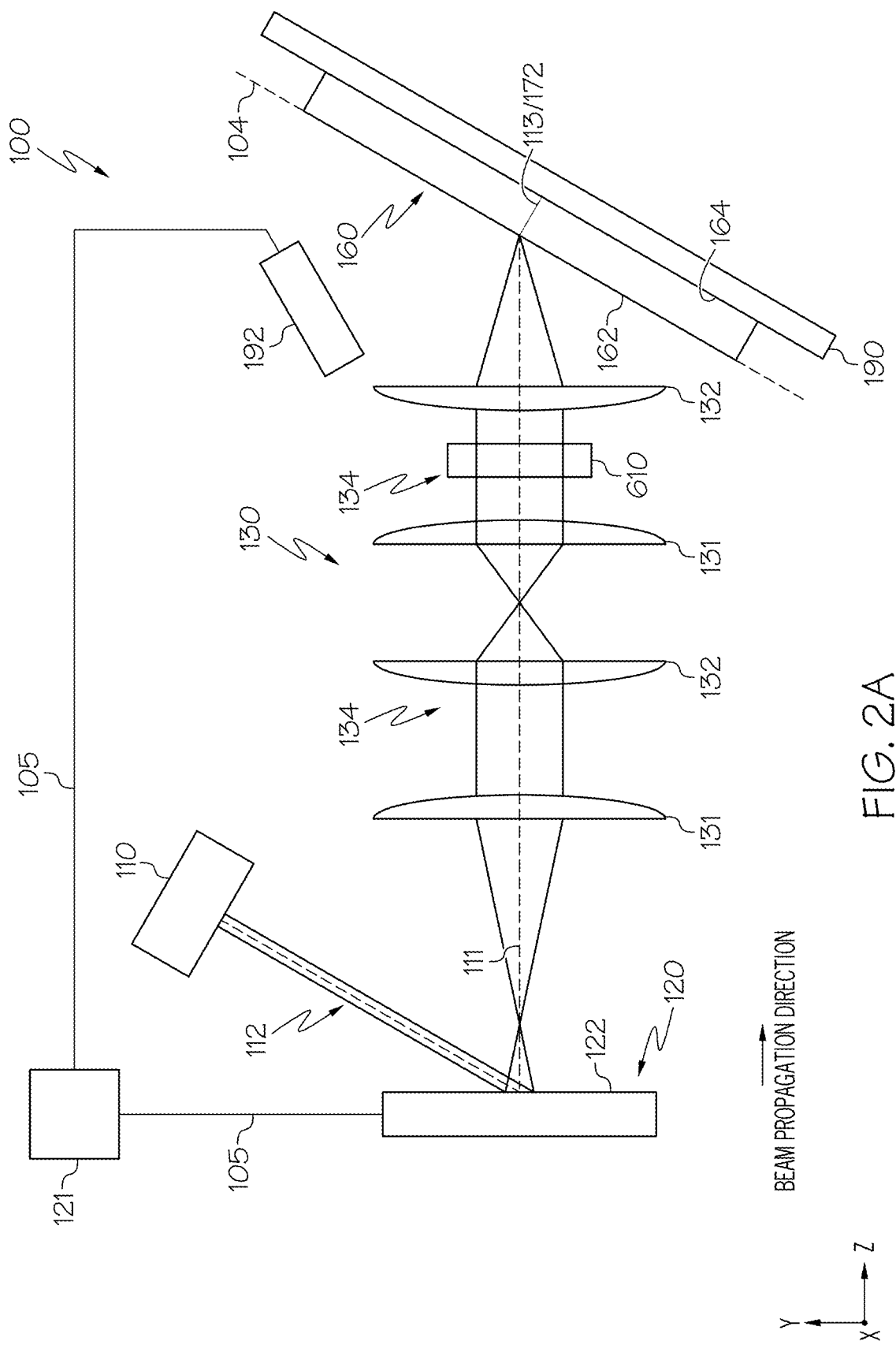
FIG. 2A schematically depicts an optical assembly for laser processing a transparent workpiece including a beam source, an adaptive phase-altering optical element and a lens assembly, according to one or more embodiments described herein.
Figure 2B:
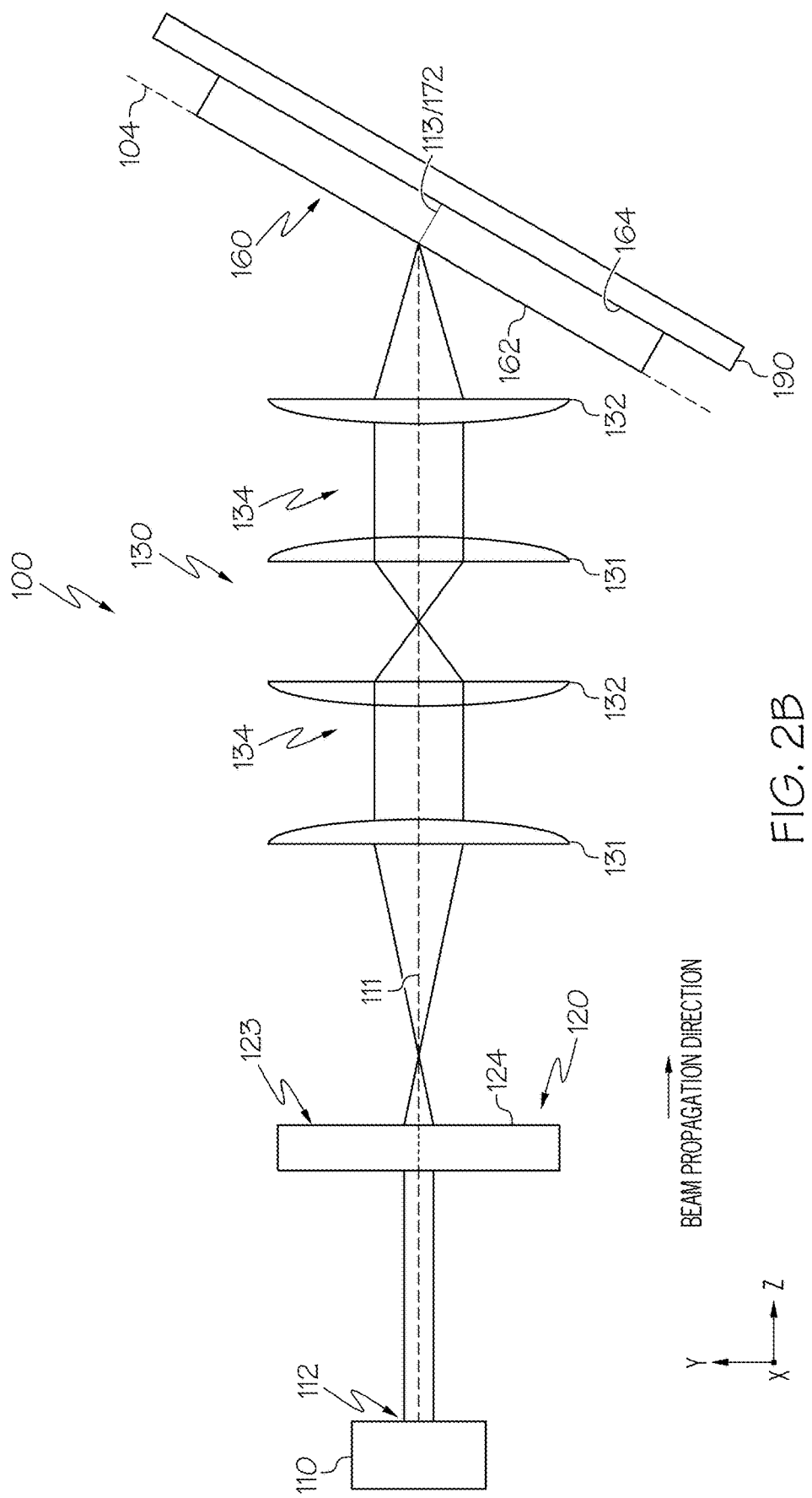
FIG. 2B schematically depicts an optical assembly for laser processing a transparent workpiece including a beam source, a static phase-altering optical element and a lens assembly according to one or more embodiments described herein.

Referring now to FIGS. 2A and 2B, an optical assembly 100 for producing the laser beam 112 that is phase modified such that it forms the laser beam focal line 113 having an internal beam angle $\theta_{bi}$ greater than 100 in the transparent workpiece 160 and having a quasi-non-diffracting character in the transparent workpiece 160 using the phase-altering optical element 120 is schematically depicted. The optical assembly 100 includes the beam source 110 that outputs the laser beam 112, the phase-altering optical element 120, and, in some embodiments, a lens assembly 130. The beam source 110 may comprise any known or yet to be developed beam source 110 configured to output laser beams 112, for example, pulsed laser beams or continuous wave laser beams. In some embodiments, the beam source 110 may output a laser beam 112 comprising a wavelength of, for example, 1064 nm, 1030 nm, 532 nm, 530 nm, 355 nm, 343 nm, or 266 nm, or 215 nm. The laser beam 112 used to form defects 172 in the transparent workpiece 160 may be well suited for materials that are transparent to the selected laser wavelength and the transparent workpiece 160 may be positioned such that the laser beam 112 output by the beam source 110 irradiates the transparent workpiece 160, for example, after impinging the phase-altering optical element 120 and thereafter, the lens assembly 130. Further, the beam pathway 111 may extend from the beam source 110 to the transparent workpiece 160 such that when the beam source 110 outputs the laser beam 112, laser beam traverses (or propagates along) the beam pathway 111.

In the embodiment depicted in FIGS. 2A and 2B, the lens assembly 130 comprises two sets of lenses, each set comprising the first lens 131 positioned upstream the second lens 132. The first lens 131 may collimate the laser beam 112 within a collimation space 134 between the first lens 131 and the second lens 132 and the second lens 132 may focus the laser beam 112. Further, the most downstream positioned second lens 132 of the lens assembly 130 may focus the laser beam 112 into the transparent workpiece 160, which may be positioned at an imaging plane 104 of this second lens 132. In some embodiments, the first lens 131 and the second lens 132 each comprise plano-convex lenses. When the first lens 131 and the second lens 132 each comprise plano-convex lenses, the curvature of the first lens 131 and the second lens 132 may each be oriented toward the collimation space 134. In other embodiments, the first lens 131 may comprise other collimating lenses and the second lens 132 may comprise a meniscus lens, an asphere, or another higher-order corrected focusing lens. In operation, the lens assembly 130 may control the position of the laser beam focal line 113 along the beam pathway 111. Further, the lens assembly 130 may comprise an 8F lens assembly, as depicted in FIGS. 2A and 2B, a 4F lens assembly comprising a single set of first and second lenses 131, 132, or any other known or yet to be developed lens assembly 130 for focusing the laser beam 112 into the laser beam focal line 113. Moreover, it should be understood that some embodiments may not include the lens assembly 130 and instead, the phase-altering optical element 120 may focus the laser beam 112 into the laser beam focal line 113.

Referring still to FIGS. 2A and 2B, the phase-altering optical element 120 is positioned within the beam pathway 111 between the beam source 110 and the transparent workpiece 160, in particular, between the beam source 110 and the lens assembly 130 such that the laser beam 112 impinges the phase-altering optical element 120 before the laser beam 112 is focused into the laser beam focal line 113 and directed into the transparent workpiece 160. In some embodiments, as shown in FIG. 2A, the beam source 110 is positioned such that the beam pathway 111 is redirected by the phase-altering optical element 120 and the laser beam 112 reflects off the phase-altering optical element 120 when the laser beam 112 impinges the phase-altering optical element 120. In this embodiment, the phase-altering optical element 120 may comprise an adaptive phase-altering optical element 122, such as a spatial light modulator, a deformable mirror, an adaptive phase plate, or any other optical element configured to actively alter a change in phase applied by the optical element to the laser beam 112. In other embodiments, as shown in FIG. 2B, the beam source is 110 is positioned such that the beam pathway 111 extends through the phase-altering optical element 120 and the laser beam 112 traverses the phase-altering optical element 120 when the laser beam 112 impinges the phase-altering optical element 120. In this embodiment, the phase-altering optical element 120 may comprise a static phase-altering optical element 123, such as an aspheric optical element or a static phase plate. One aspheric optical element used in embodiments described herein is an oblong axicon. Thus, in some embodiments, the phase-altering optical element 120 is a refractive optical element and in other embodiments, the phase-altering optical element 120 is a reflective optical element.

In some embodiments, after the laser beam 112 impinges a phase-altering optical element 120, each individual ray of the plurality of rays of the laser beam 112 may have a different angle relative to the excidence surface of phase-altering optical element 120, varying based on azimuthal angle at a given radial position. As used herein "excidence surface" refers to the surface of phase-altering optical element 120 from which a ray propagates to a position downstream of the phase-altering optical element 120. In embodiments in which laser beam 112 is directed in the downstream direction without passing through phase-altering element 120 (e.g. FIG. 2A), the excidence surface corresponds to the surface of incidence. In embodiments in which a laser beam 112 is directed in the downstream direction after passing through phase-altering optical element 120 (e.g. FIG. 2B), the excidence surface corresponds to the downstream surface of phase-altering optical element 120.) Excidence surface may also be referred to herein as the exit surface of phase-altering optical element 120. As used herein, "azimuthal angle" of a ray refers to angular position of the point of intersection of the ray with the excidence surface of phase-altering element 120. In FIGS. 2A and 2B, for example, the excidence surface of phase-altering element 120 coincides with an XY plane and the intersection of beam propagation direction Z with the XY plane defines a reference point in the XY plane about which radial position and azimuthal angle are defined. Radial position is distance from the reference point and corresponds to distance from the Z-axis. Azimuthal angle extends from 0° to 360° for one revolution in the XY plane about the reference point. The direction in the XY plane corresponding to an azimuthal angle of 0° is arbitrary and can, for example, be selected to correspond to the X-direction. The ray angle is the angle of the ray relative to a normal from the excidence surface.

Azimuthal variation of the ray angle occurs, for example, when the phase-altering optical element is an egg-shaped axicon (described below). In such embodiments, multiple rays, originating with different ray angles from different radial positions of the excidence surface of the phase-altering optical element, converge to form a particular point along the laser beam focal line 113. Because of the difference in radial position, the optical path lengths of the individual rays converging to (or intersecting at) a particular point along the laser beam focal line 113 differ. As used throughout this disclosure, the term "optical path length" refers to the distance between the excidence surface of the phase-altering optical element 120 and the laser beam focal line 113. This difference in optical path length leads to a difference in phase of the different rays converging to a particular point along the laser beam focal line 113 and this difference in phase leads to destructive interference that diminishes the intensity of the laser beam focal line 113, thus inhibiting formation of defects and compromising the ability use the laser beam focal line 113 to cut and the separate transparent workpiece 160. Therefore, in order for the laser beam 112 at the laser beam focal line 113 to exhibit a quasi-non-diffracting character, each individual ray of the plurality of rays within the laser beam focal line 113 must have the same phase, $\phi$, when converging to form the angular spectrum, as previously stated.

To correct the phase of the plurality of rays converging to a particular point along the laser beam focal line 113, in embodiments, a phase correction may be applied to the phase-altering optical element 120. The phase correction may be constant with regards to radial distance (position), but may vary with azimuthal position (angle). This allows the phase correction to correct the phase of individual rays of the plurality of rays, such that rays that converge and intersect at a particular point along the laser beam focal line 113 have the same phase, $\phi$. This is necessary in order to forma laser beam focal line 113 exhibiting a quasi-non-diffracting character without destructive interference and without affecting the shape of the angular spectrum formed by the intersecting rays. Without intending to be bound by theory, this may result in a small, high-intensity, symmetrical (or almost symmetrical) quasi-non-diffracting beam. If the phase correction were not applied by the phase-altering optical element 120 when forming the quasi-non-diffracting beam, the laser beam focal line 113 within the transparent workpiece 160 would be aberrated. In embodiments, a phase-aberrated laser beam focal line may have lower intensity, may have a larger cross-section, and/or may be asymmetrical. As such, a phase-aberrated laser beam focal line may be incapable of forming a defect in a glass substrate, or may perform worse than a laser beam focal line 113 as disclosed herein where the phase correction was applied.

To develop the phase correction, a vectorized form of Snell's law is used:

$$\vec{s}_2 = \frac{n_1}{n_2}\left[\vec{N}\left(-\vec{N}\times\vec{s_1}\right)\right] - \vec{N}\sqrt{1 - \left(\frac{n_1}{n_2}\right)^2 \left(\vec{N}\times\vec{s_1}\right)\cdot\left(\vec{N}\times\vec{s_1}\right)} \tag{33}$$

where $\vec{s}_1$ is the direction (relative to a normal to the impingement surface 162) of an individual ray in the transparent workpiece 160, $\vec{s}_2$ is the direction (relative to a normal to the impingement surface 162) of an individual ray in air (or other medium immediately upstream of impingement surface 162), $n_1$ is the refractive index of the transparent workpiece 160, $n_2$ is the refractive index of air (or other medium immediately upstream of impingement surface 162), and $\vec{N}$ is the orthogonal plane 106 relative to the impingement surface 162. After refraction of the rays at the impingement surface 162, the polar angle (angle of refraction of the ray into transparent workpiece 160, equivalent to $\theta_{bi}$) of each individual ray will vary based on the azimuthal angle of the ray at impingement surface 162, and the incoming laser beam 112 after passing through (or being reflected from) the phase-altering optical element 120 may no longer be radially symmetric about a central or principal axis of the phase-altering optical element 120. The propagation direction of the laser beam refracted into the transparent workpiece 160 at the impingement surface 162 will be angled with respect to the direction of incidence at impingement surface 162 as expressed below:

$$\theta_{CoM} = \sin^{-1}\left(\frac{n_1}{n_2}\sin(\theta_{surf})\right) \quad (34)$$

where $\theta_{surf}$ is the angle between the direction of incidence of the laser beam and the impingement surface 162 and $\theta_{CoM}$ is the polar angle ($\theta_{bi}$), which defines the direction of beam propagation (and also defines the principal optical axis) in transparent workpiece 160. To determine the phase correction, a laser beam focal line 113 oriented at a particular angle $\theta_{bi}$ is conceptualized inside the transparent workpiece 160. The conceptualized laser beam focal line consists of a series of focal points, each of which corresponds to an intersection of a plurality of phase-matched converging rays emanating from the exit surface of the phase-altering optical element 120 as described above. Each ray of the conceptualized laser beam focal line propagates with a direction $\vec{s}_1$ in the transparent workpiece 160 and can be traced back from the conceptualized laser beam focal line within the transparent workpiece 160 through the impingement surface 162 to the medium immediately upstream of impingement surface 162.

Equation (33) can be used determine the direction $\vec{s}_2$ for each ray in the medium immediately upstream of impingement surface 162 necessary to produce the conceptualized laser beam focal line. The direction $\vec{s}_2$ defines the position (azimuthal and radial) of the point of origin of each ray from the exit surface of the phase-altering optical element 120 and the angle $\theta_{ref}$ of each ray relative to the normal of the exit surface of the phase-altering optical element 120. From $\theta_{ref}$ the phase imparted to laser beam 112 at each point of the exit surface of phase-altering optical element 120 (e.g. phase mask 150 shown in FIG. 3B) can be determined from equation (35), where $\phi_{egg}$ represents the phase mask defined for the phase-altering optical element 120, $k_0$ represents the wavenumber of the beam in air (or other medium between the phase-altering optical element 120 and impingement surface 162), and ρ represents the distance from the center of the phase mask in radial coordinates:

$$\phi_{egg}=k_0\rho\,\tan(\theta_{ref}) \quad (35)$$

The correction embodied in phase mask $\phi_{egg}$ is sufficient to produce rays which all have the same polar angle with respect to the primary optical axis within the workpiece. This means that the beam within the workpiece will have a circular angular spectrum similar to that of a unaberrated Bessel beam. These rays will intersect on the laser beam focal line 113 when the impingement surface 162 is placed at the focal point of the lens 132 (or the most downstream focal point of lens assembly 130). In this situation, laser beam focal line 113 initiates at impingement surface 162. While rays will intersect in the focal line with the same polar angle, path length differences due to different lengths traveled in air and the glass workpiece may cause aberrated foci to form. Additionally, it may be desirable to move the transparent workpiece 160 along the Z-direction and impingement surface 162 away from the focal point of the lens 132. In such embodiments, additional aberrations due to the path length difference will reduce the maximum intensity of the laser beam focal line 113. To then develop a phase correction for $\theta_{ref}$, first, an offset ζ is chosen that represents the distance from the focal point of the lens 132 (where an optical conjugate image of the phase mask is formed) to the impingement surface 162 of the transparent workpiece 160. Then, a phase correction may be added on $\phi_{egg}$ to correct for the phase shift induced by the path length difference for each ray. To find this correction, the optical distance, OD, accounting for the refractive index, is first found for each ray, using equation 33 to account for refraction at the impingement surface 162:

$$OD=n_g d_g + n_a d_a \quad (36)$$

where $d_g$ represents the distance for each ray from a point on the laser beam focal line 113 to its intersection with the impingement surface 162, and $d_a$ represents the distance for each ray from the impingement surface 162 to the conjugate image plane of the phase mask at the focal point of the lens 132. OD will then be an array of the optical distance traveled for each ray from the point where it intersects to form the laser beam focal line 113 to the conjugate image plane of the phase mask. $d_g$ and $d_a$ may be found using a simple geometric intersection of a line and a plane, along with equation (33) to determine the change in each ray's direction at the impingement surface. The phase offset in radians for each individual ray is given by the distance traveled multiplied by the wavenumber $k_0$, where $k_0=2\pi/\lambda$:

$$\phi_{OD}=k_0*OD \quad (37)$$

Since OD is an array, $\phi_{OD}$ will represent an array consisting of the phase correction for each ray in a bundle of rays starting from points along the laser beam focal line 113. The resolution of $\phi_{OD}$ may be controlled by changing the number of rays in the bundle. Additionally, a linear or cubic interpolation function may be used along with the final spatial location of each ray to create a smooth phase mask.

Therefore, a corrected phase mask $\phi_{mask}$ for phase-altering optical element 120 may be created with the following formula:

$$\phi_{mask}=\phi_{egg}-\phi_{OD} \quad (37)$$

In operation, impinging the laser beam 112 on the phase-altering optical element 120 alters the phase of the laser beam 112 and when directed into the transparent workpiece 160 at a beam propagation angle $\theta_{bp}$, a portion of the laser beam 112 comprising the laser beam focal line 113 within the transparent workpiece 160 comprises an internal beam angle $\theta_{bi}$ of greater than 10° and comprises a quasi-non-diffracting character within the transparent workpiece 160. For example, the internal beam angle $\theta_{bi}$ may be from 10° to 40°, such as 10° to 35°, 15° to 40°, 20° to 40°, or the like, for example, 110, 12°, 13°, 14°, 15°, 16°, 17, 18°, 19°, 20°, 21°, 22°, 23°, 24°, 25°, 26°, 27°, 28°, 29°, 30°, 31°, 32°, 33° 34°, 35°, 36°, 37° 38°, 39° or the like.

In embodiments, after impinging the laser beam 112 on the phase-altering optical element 120, a portion of the laser beam focal line 113 may extend outside of the transparent workpiece 160, forming an external laser beam focal line 117 situated in the free space above (upstream) the transparent workpiece 160 (FIG. 1). For example, the external laser beam focal line 117 may extend at least 0.01 mm, at least 0.02 mm, at least 0.03 mm, at least 0.05 mm, at least 0.07 mm, at least 0.1 mm, at least 0.2 mm, at least 0.3 mm, at least 0.5 mm, or at least 1 mm above (upstream) the transparent workpiece.

While not intending to be limited by theory, after the laser beam 112 has been phase modified by the phase-altering optical element 120, the external laser beam focal line 117 comprises a circular or approximately circular angular spectrum and the laser beam focal line 113 within transparent workpiece 160 comprises a circular or approximately circular angular spectrum. Each of the external laser beam focal line 117 and laser beam focal line 113 within transparent workpiece 160 has a Rayleigh defined by a divergence factor $F_D$ greater than or equal to 10. In embodiments, the laser beam 112 is aberrated (that is, has a non-circular angular spectrum) when the laser beam is upstream from the formation of the external laser beam focal line 117 or the transparent workpiece 160, and upon refraction of the laser beam 112 at the impingement surface 162 of the transparent workpiece 160, the laser beam 112 exhibits a quasi-non-diffracting character with minimal to no aberrations within the transparent workpiece 160 (that is, the laser beam focal line 113 within transparent workpiece 160 has a circular or approximately circular angular spectrum).

Moreover, while the laser beam focal lines 113 depicted in the figures extend from the impingement surface 162 to the opposite surface 164, this merely illustrates one possible disposition of the laser beam focal line 113 in and near the transparent workpiece 160. In particular, it should be understood that a portion of the laser beam focal line 113 may extend outside of the transparent workpiece 160, for example, above (upstream) the impingement surface 162, beyond (downstream) the opposite surface 164, beyond the edge surface 166, or combinations thereof. Further, when a portion of the laser beam focal line 113 extends outside of the transparent workpiece 160, that external portion of the laser beam focal line 113 comprises an external focal line angle which, due to Snell's law, is greater than the internal beam angle $\theta_{bi}$. Moreover, it should be understood that the laser beam focal line 113 may start at a location within the transparent workpiece 160 (e.g., between the impingement surface 162 and the opposite surface 164) and end at a location within the transparent workpiece 160 (e.g., between the impingement surface 162 and the opposite surface 164).

As stated previously, the external laser beam focal line 117 may comprise a circular or approximately circular angular spectrum and the laser beam focal line 113 may also comprise a circular or approximately circular angular spectrum within the transparent workpiece 160. For the laser beam 112 to have a circular angular spectrum in both free space (i.e. for the external laser beam focal line 117 to have a circular angular spectrum) and a circular angular spectrum within the transparent workpiece 160 (i.e. for the laser beam focal line 113 to have a circular angular spectrum within the transparent workpiece 160), two different phase shifts must be applied to separate portions of the laser beam 112. In embodiments, one phase shift, referred to here as a "circular phase shift," would result in a circular angular spectrum in free space and an oblong angular spectrum within the transparent workpiece 160. In embodiments, another phase shift, referred to here as an "oblong phase shift," would result in an oblong angular spectrum in free space and would result in a circular angular spectrum within the transparent workpiece 160. In embodiments, the circular phase shift may be similar to a phase imparted by a circular axicon, and the oblong phase shift may be similar to a phase imparted by an oblong axicon.

Figure 3A:
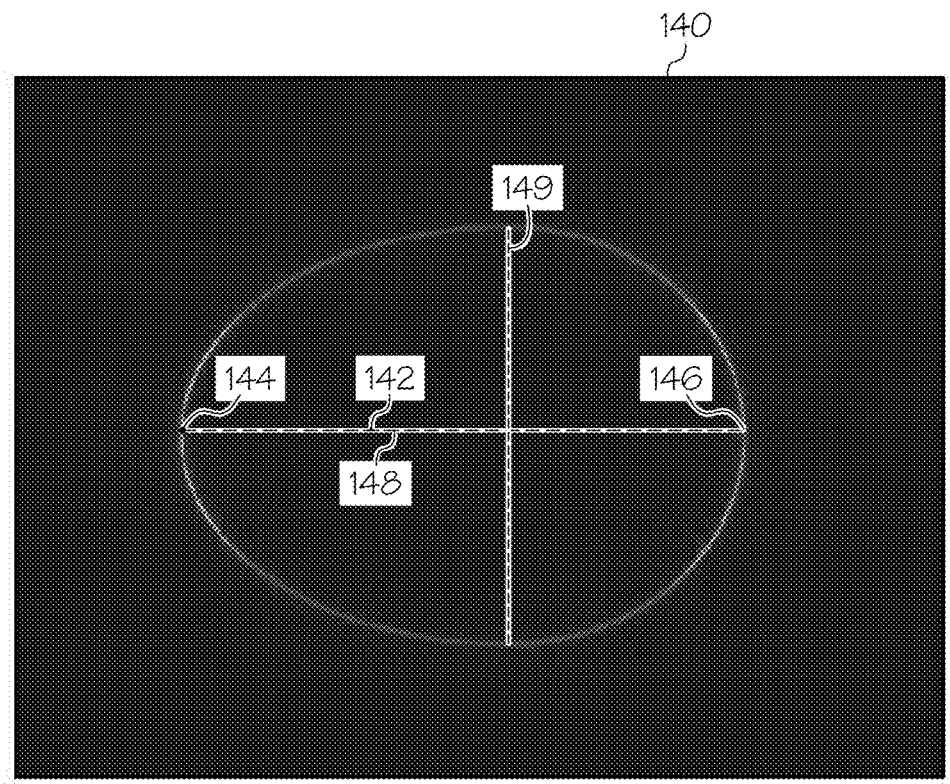
FIG. 3A schematically depicts an oblong angular spectrum of a laser beam after phase-altering the laser beam, according to one or more embodiments described herein.

FIG. 3A depicts an example of oblong angular spectrum 140, which may be applied by the phase-altering optical element 120 to the laser beam 112 to insure that the laser beam focal line 113 exhibits essentially aberration-free character at a particular internal beam angle $\theta_{bi}$ greater than or equal to 100 and a particular spacing between the focal plane of lens 132 and impingement surface 162. The oblong angular spectrum 140 is designed to correct for aberrations that occur when an angled beam refracts at impingement surface 162 as well as to correct for aberrations resulting from the path length differences described above. In particular, the embodiment shown in FIG. 3A depicts an oblong angular spectrum 140 comprising an axis of symmetry 142 extending from a first axis end 144 having a first radius of curvature to a second axis end 146 having a second radius of curvature. Further, the first radius of curvature (i.e., the radius of curvature at the first axis end 144) is different than the second radius of curvature (i.e., the radius of curvature at the second axis end 146). In other words, the shape of the oblong angular spectrum 140 is roughly the combination of two different ellipses (or ovals) differing in curvature, and is colloquially referred to herein as an "egg shape." In addition, the oblong angular spectrum 140 includes a major axis 148 (sometimes referred to as a "long axis") and a minor axis 149 (sometimes referred to as a "short axis"), where the major axis 148 is coincident with the axis of symmetry 142.

Figure 3B:
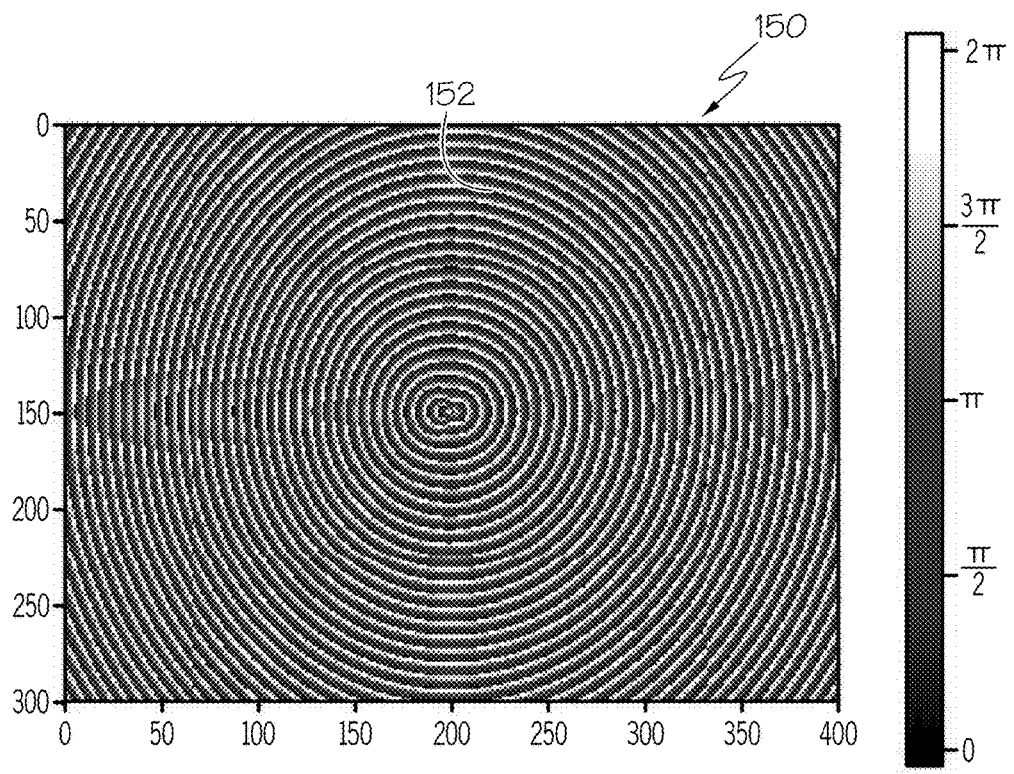
FIG. 3B schematically depicts a phase mask used to phase alter a laser beam, according to one or more embodiments described herein.

FIG. 3B depicts a phase mask 150 that may be used by the phase-altering optical element 120 to phase alter the laser beam 112 to produce the angular spectrum 140 shown in FIG. 3A. As shown in FIG. 3B, the phase mask 150 of the laser beam 112 comprises a plurality of phase rings 152 each inducing a phase shift extending from 0 to $2\pi$, where the phase mask has an x-axis of about 400 pixels and a y-axis of about 300 pixels. Further, the phase rings 152 in the portion of the phase mask 150 where x is greater than about 60 pixels and x is less than about 350 pixels each comprise a circular shape similar to a circular angular spectrum. The phase rings 152 in the portions of the phase mask 150 where x is less than about 60 pixels and x is greater than about 350 pixels each comprise an oblong shape similar to the oblong angular spectrum 140. Indeed, each phase ring 152 in the portions of the phase mask 150 where x is less than about 60 pixels and x is greater than about 350 pixels comprises an axis of symmetry extending from a first axis end having a first radius of curvature to a second axis end having a second radius of curvature, where the first radius of curvature is different than the second radius of curvature. However, unlike the oblong angular spectrum 140, the minor axis of each phase ring 152 of the phase mask 150 is coincident with the axis of symmetry of each phase ring 152, instead of the major axis.

Without intending to be limited by theory, the oblong angular spectrum 140 depicted in FIG. 3A is indicative of the particular phase alteration applied to the laser beam 112 to facilitate the formation of a laser beam focal line 113 that exhibits quasi-non-diffracting character within the transparent workpiece 160 after the laser beam 112 is directed at a high beam propagation angle $\theta_{bi}$ into an impingement surface 162, which is planar. The oblong angular spectrum 140 is shaped such that, when the laser beam 112 (e.g., the laser beam focal line 113) is refracted at the impingement surface 162 (e.g., at the air-glass interface formed at the impingement surface 162), the laser beam 112 within the transparent workpiece 160 (e.g., the laser beam focal line 113) comprises a circular or approximately circular angular spectrum. That is, refraction of the laser beam 112 having the oblong angular spectrum 140 at the impingement surface 162 transforms the angular spectrum of the laser beam 112 to a less oblong, more circular shape within the transparent workpiece 160. For example, in some embodiments, the laser beam 112 within the transparent workpiece 160 (e.g., the laser beam focal line 113) may have an angular spectrum that has a first radius of curvature and a second radius of curvature, similar to the oblong angular spectrum 140; however the angular spectrum of the laser beam 112 within the transparent workpiece 160 is more circular (e.g., less oblong) than the oblong angular spectrum 140 such that a difference between the first radius of curvature and the second radius of curvature of the angular spectrum of the laser beam 112 within the transparent workpiece 160 is less than a difference between the first radius of curvature and the second radius of curvature of the oblong angular spectrum 140 of the laser beam incident to the impingement surface 162 of the transparent workpiece 160.

Referring again to FIG. 2A, in some embodiments, the phase-altering optical element 120 may comprise an adaptive phase-altering optical element 122 which applies a phase alteration to the laser beam 112. The adaptive phase-altering optical element 122 may be communicatively coupled to a controller 121, for example, using one or more communications pathways 105, which may comprise any pathway for providing power signals, control signals, or the like, such as optical fiber, electrical wire, wireless protocols, or the like. In operation, the controller 121 may provide control signals to the adaptive phase-altering optical element 122 to control the specific phase alteration (e.g., modulation, phase mask, or the like) applied by the adaptive phase-altering optical element 122, such that the adaptive phase-altering optical element 122 applies a specific phase alteration to the laser beam 112, for example, based on a phase function.

In some embodiments, the adaptive phase-altering optical element 122 comprises a spatial light modulator, which is a transmissive or reflective device that may spatially modulate the amplitude and/or the phase of a laser beam 112 in at least one dimension, for example, using a phase mask, such as the phase mask 150 of FIG. 3B. In operation, the spatial light modulator may apply a selective, configurable phase alteration to the laser beam based on control signals from the controller 121. In some embodiments, the adaptive phase-altering optical element 122 comprises a deformable mirror, which is a mirror whose surface can be deformed in response to control signals, such as control signals from the controller 121, to alter the wavefront of the laser beam 112, which may alter the phase of the laser beam 112. For example, a deformable mirror may be configured to apply a phase mask, such as the phase mask 150. Further, in some embodiments, the adaptive phase-altering optical element 122 comprises an adaptive phase plate, which is a phase plate (or phase plate assembly) that can apply selective and controllable phase alteration to the laser beam 112 in response to control signals, such as control signals from the controller 121. For example, the adaptive phase plate may be two or more phase plates moveable relative to one another (based on control signals from the controller 121) to alter the phase change they apply to the laser beam 112 based on their relative positioning.

Figure 4A:
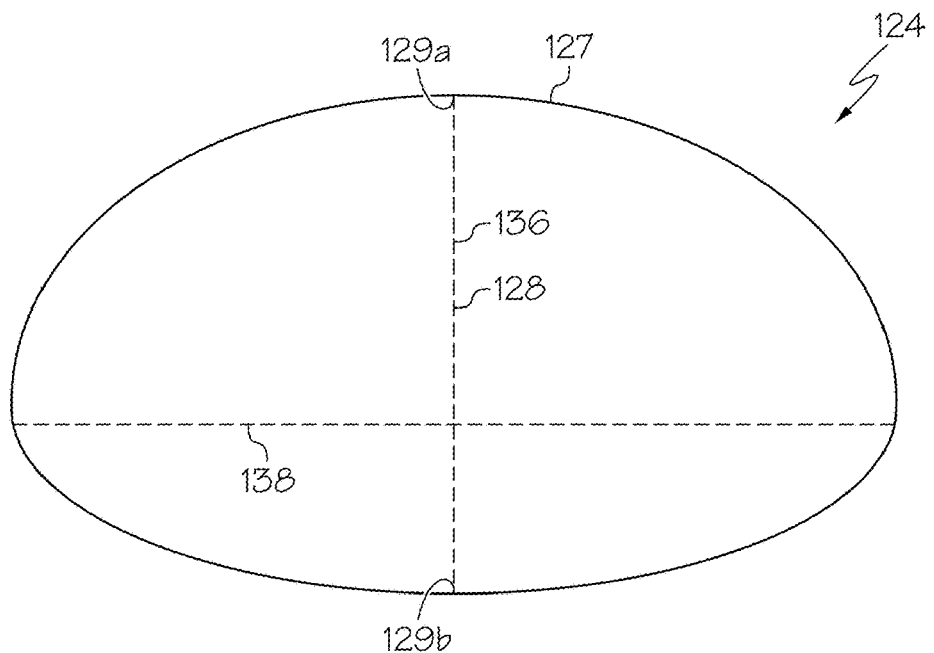
FIG. 4A schematically depicts a top view of an oblong axicon, according to one or more embodiments described herein.
Figure 4B:
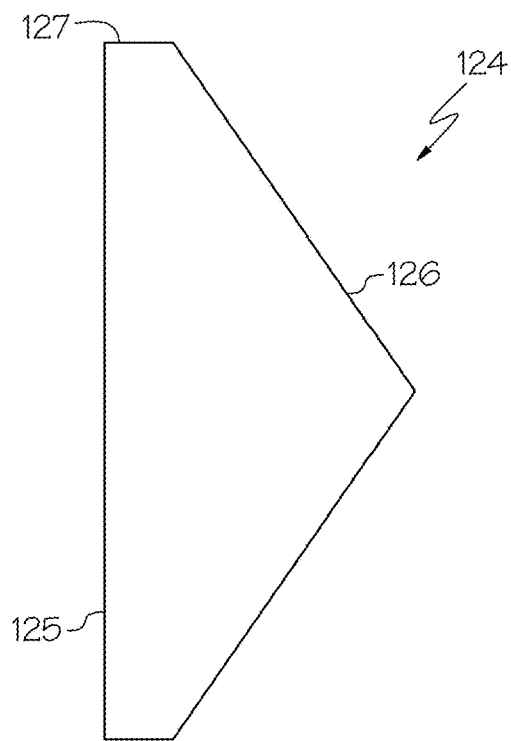
FIG. 4B schematically depicts a side view of the oblong axicon of FIG. 4A, according to one or more embodiments described herein.

As shown in FIG. 2B, in some embodiments, the phase-altering optical element 120 comprises a static phase-altering optical element 123, such as an oblong axicon 124, which is depicted in more detail in FIGS. 4A and 4B. In particular, FIG. 4A depicts a front view of the oblong axicon 124 and FIG. 4B shows a side view of the oblong axicon 124. The oblong axicon 124 comprises a base portion 125 and a conical portion 126 extending from the base portion 125. The base portion 125 comprises an oblong perimeter 127 having an axis of symmetry 128 extending from a first axis end 129a to a second axis end 129b. At the first axis end 129a, the oblong perimeter 127 comprises a first radius of curvature and at the second axis end 129b, the oblong perimeter 127 comprises a second radius of curvature, which is different from the first radius of curvature. In addition, the oblong axicon 124 comprises a major axis 138 and a minor axis 136. In operation, when the laser beam 112 traverses the oblong axicon 124, the phase alteration applied to the laser beam 112 results in the laser beam 112 comprising the oblong angular spectrum 140. Moreover, as depicted in FIGS. 3A and 4A, the shape of the oblong perimeter 127 of the oblong axicon 124 corresponds with the oblong angular spectrum 140. However, unlike the oblong angular spectrum 140, the minor axis 136 of the oblong perimeter 127, instead of the major axis 138, is coincident with the axis of symmetry 128 of the oblong perimeter 127 of the oblong axicon 124. While a single phase-altering optical element 120 is depicted in FIGS. 2A and 2B, other embodiments may comprise multiple phase-altering optical elements 120, for example, one phase-altering optical element configured to transform the laser beam into a quasi-non-diffracting beam and another phase-altering optical element configured to form the oblong angular spectrum 140.

While not intending to be limited by theory, it should be understood that Snell's law imposes some limitations on the maximum internal beam angle $\theta_{bi}$ of the laser beam focal line 113 formed using the above described techniques. Snell's law is mathematically defined as $$\theta_2 = \sin^{-1}\left(\frac{n_1 \sin\theta_1}{n_2}\right)$$

where $\theta_1$ is the angle of an incident light ray in a first medium (e.g., air), $\theta_2$ is the angle of the ray in a second medium (e.g., the transparent workpiece 160), $n_1$ is the index of refraction of the first medium (e.g., air, which comprises an index of refraction of about 1), and $n_2$ is the index of refraction of the second medium (e.g., the transparent workpiece 160, which may comprise about 1.45 in embodiments in which the transparent workpiece 160 comprises glass). The angles $\theta_1$ and $\theta_2$ are measured relative to the normal to the surface of incidence (e.g. impingement surface 162) of the light ray. Snell's law provides a fundamental limit on the angle of light (e.g. internal beam angle $\theta_{bi}$) that can be achieved within the transparent workpiece 160. This limit is the critical angle of the transparent workpiece 160. It should be understood that, for a transparent workpiece 160 comprising another material besides glass, the critical angle would vary based on the index of refraction of that particular material.

When the transparent workpiece 160 comprises glass having an index of refraction of 1.45, the critical angle is about 43.6°. The critical angle is also the internal angle a light ray would take if it contacted the glass with an almost 90° incidence. Thus, Snell's Law limits the internal beam angle $\theta_{bi}$ of the laser beam focal line 113. Furthermore, as depicted in FIG. 1C, the laser beam 112 may comprise a cone shape when it impinges the impingement surface 162 of the transparent workpiece 160, as the laser beam 112 comprises the maximum beam propagation angle $\theta_{bmax}$ and the minimum beam propagation angle $\theta_{bmin}$. In some embodiments, the difference between the maximum beam propagation angle $\theta_{bmax}$ and the minimum beam propagation angle $\theta_{bmin}$ (i.e., a cone angle) is a range of 5° to 30°. As an example, if the laser beam 112 impinges the impingement surface 162 of the transparent workpiece 160 with a cone angle of 10°, the maximum internal beam angle $\theta_{bi}$ of the laser beam focal line 113 inside the transparent workpiece 160 would be 33.6°, assuming light could be incident to the transparent workpiece 160 up to 90°.

While not intending to be limited by theory, some reflection of the laser beam 112 may occur at the impingement surface 162 of the transparent workpiece 160. For example, the reflection of a light ray impinging the impingement surface 162 at 90° relative to normal the impingement location 115 will be 100% for both S-polarization and P-polarization and the reflection of a light ray impinging the impingement surface 162 at angles less than 90 degrees relative to normal the impingement location 115 will be less than 100% of S-polarization and P-polarization. While the laser beam 112 may comprise P-polarized light or S-polarized light, P-polarized light may reduce loss due to reflection. For example, at 85 degrees, the reflectance for S-polarized light is 73%, and reflectance for P-polarized light is 49%. In operation, the beam source 110, the phase-altering optical element 120, or an additional optical component, such as a polarizer, may be used to S-polarize or P-polarize the laser beam 112. While still not intending to be limited by theory, if the magnitude of light intensity around the angular spectrum of the laser beam focal line 113 within the transparent workpiece 160 is non-uniform, the laser beam focal line 113 retains a circular angular spectrum and a quasi-non-diffracting character within the transparent workpiece 160. However, non-uniform magnitude of light intensity around the angular spectrum of the laser beam focal line 113 within the transparent workpiece 160 caused by reflection may be compensated for by launching the laser beam 112 (i.e., launching the laser beam 112 from the beam source 110) with a non-uniform intensity, where the non-uniform intensity is configured to become uniform around the angular spectrum once the light is refracted at the impingement surface 162 and enters the transparent workpiece 160. Example non-uniform intensity beams that may be used (and then converted into a quasi-non-diffracting beam with an oblong or otherwise non-uniform angular spectrum by the phase-altering optical element 120) include an elliptical-Gaussian beam, a top hat beam, or another beam having an arbitrary intensity profile.

Figure 5A:
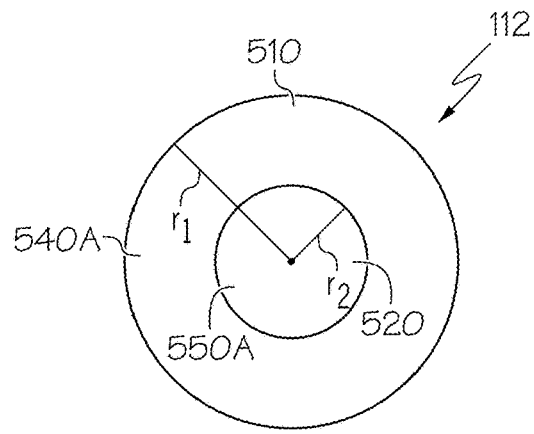
FIG. 5A schematically depicts a cross-section of a laser beam, according to one or more embodiments described herein.

Referring now to FIGS. 1A, and 5A-7C, in embodiments, the laser beam may comprise at least a first set of rays 510 and a second set of rays 520, where each first set of rays 510 and second set of rays 520 is independently modified by different portions of the phase mask or phase-altering optical element 120. In embodiments, the first set of rays 510 or second set of rays 520 may be obstructed with an optical blocking element such as 610A-C. The optical blocking element may be a blank area in the phase mask 150 (as shown in black in FIGS. 6A-6C) or may be a physical opaque component positioned along the beam pathway 111 downstream the phase mask (e.g. optional optical blocking element 610 shown in FIG. 2A) or positioned on a lens 132 (not shown). In embodiments where a refractive optical element is used, the optical blocking element may be a section of the refractive optical element that is flat or diverging. In embodiments, the first set of rays 510 and the second set of rays 520 may form segments 540A and 550A, as shown in FIG. 5A. For example, the first set of rays 510 may define a first segment 540A (an exemplary segment having an annular shape) of the laser beam 112 and the second set of rays 520 may define a second segment 550A (an exemplary segment having a circular shape) of the laser beam 112. In embodiments, an average radius $r_2$ of the second segment 550A may be less than an average radius $r_1$ of the first segment 540A, meaning that the second segment 550A is positioned within the first segment 540A. In other embodiments, as shown in FIG. 5B, the average radius $r_2$ of the second segment 550B (an annular segment defined by the second set of rays 520) may be greater than the average radius $r_1$ of the first segment 540B (a circular segment defined by the first set of rays 510), meaning that the first segment 540B is positioned within the second segment 550B. In embodiments, the first set of rays 510 may comprise a portion of the second set of rays 520, or the second set of rays 520 may comprise a portion of the first set of rays 510. The optical blocking element need not be in the shape of a circular annulus or a circular area as shown in FIGS. 6A-C. Instead, the optical blocking element may be an oblong annulus, an oblong shape, an 'egg' shape or some combination thereof. Additionally, the optical blocking element may be any other shape.

In embodiments, to calculate the required length of $r_1$, $r_2$, and $r_3$, the origin of each ray traced from the laser beam focal line may be noted in the array $Z_{origin}$ when the phase corrections are calculated. This may, for example, be recorded as a depth below or above the impingement surface 162, or as the Z-coordinate of each ray's origin point. The radii $r_1$, $r_2$, and $r_3$ will then be isocurves of $Z_{origin}$. $Z_{origin}$ may be used directly or interpolated using each ray's final position on the phase mask.

Figure 5B:
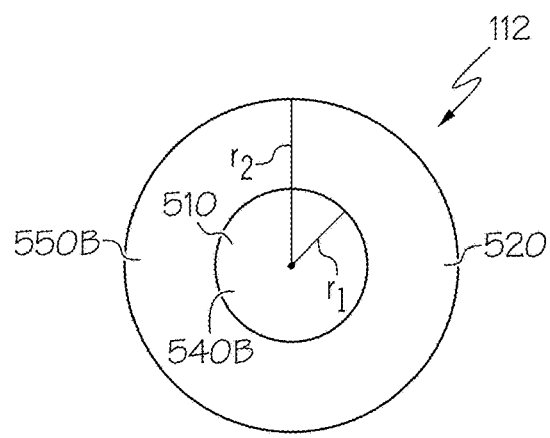
FIG. 5B schematically depicts a cross-section of a laser beam, according to one or more embodiments described herein.
Figure 6A:
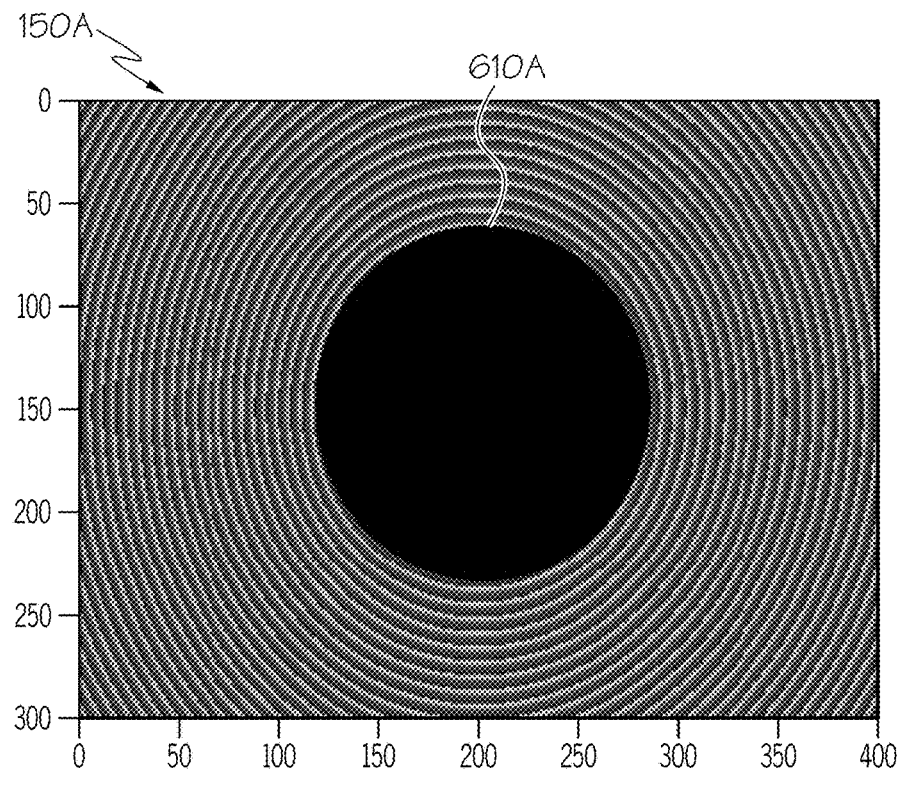
FIG. 6A schematically depicts a phase mask used to phase alter a laser beam, according to one or more embodiments described herein.
Figure 6B:
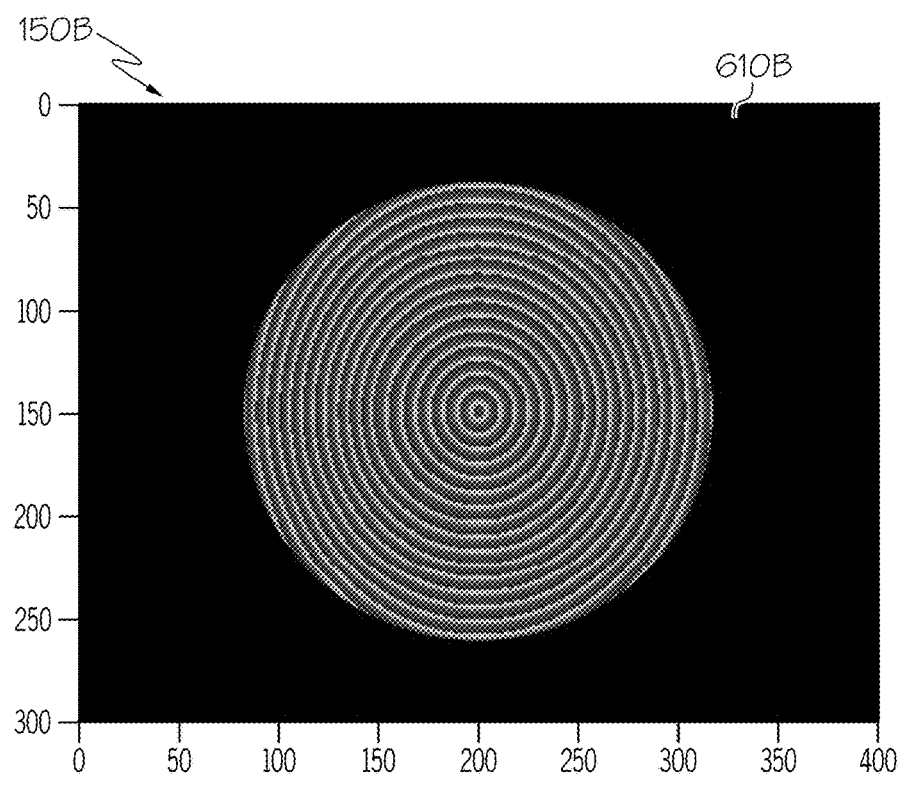
FIG. 6B schematically depicts a phase mask used to phase alter a laser beam, according to one or more embodiments described herein.
Figure 6C:
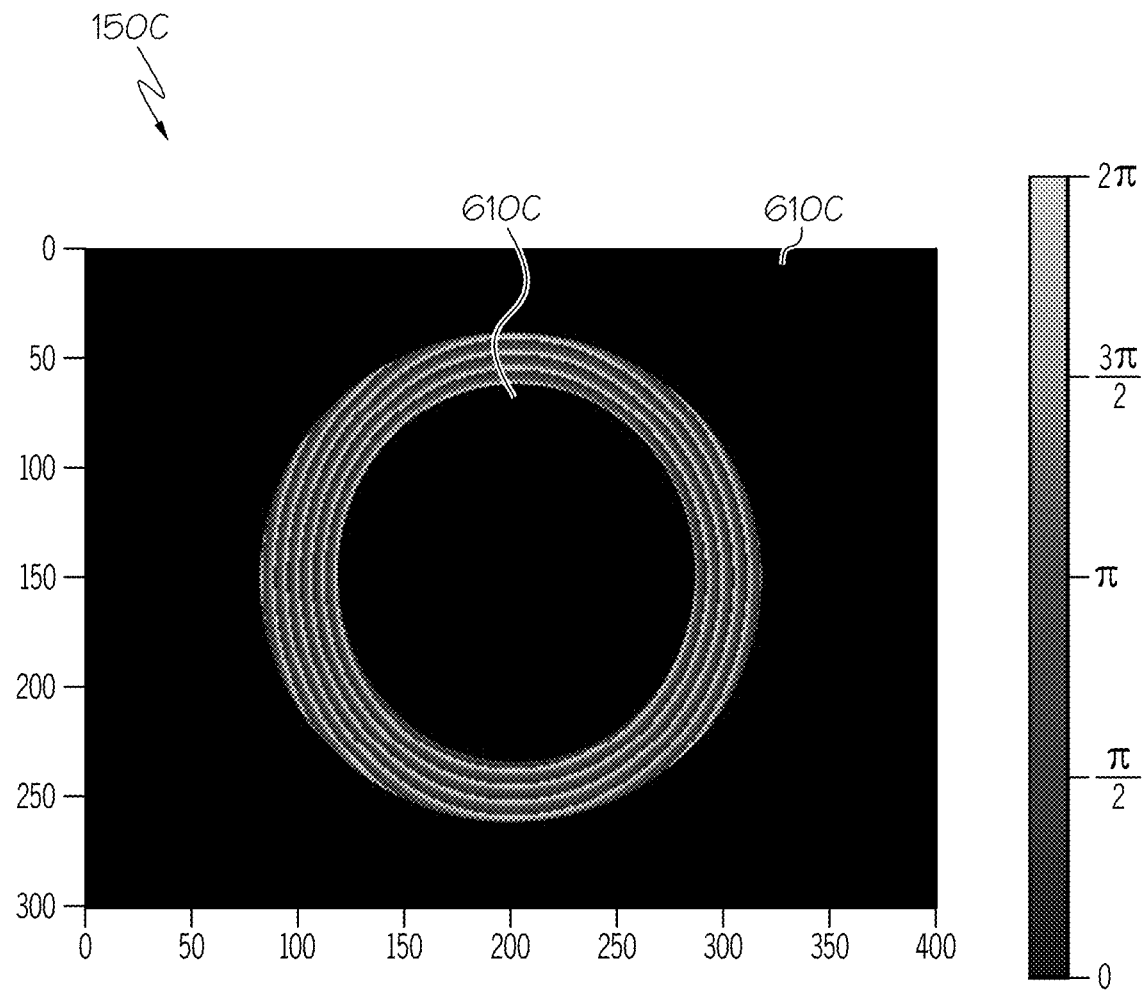
FIG. 6C schematically depicts a phase mask used to phase alter a laser beam, according to one or more embodiments described herein.
Figure 7A:
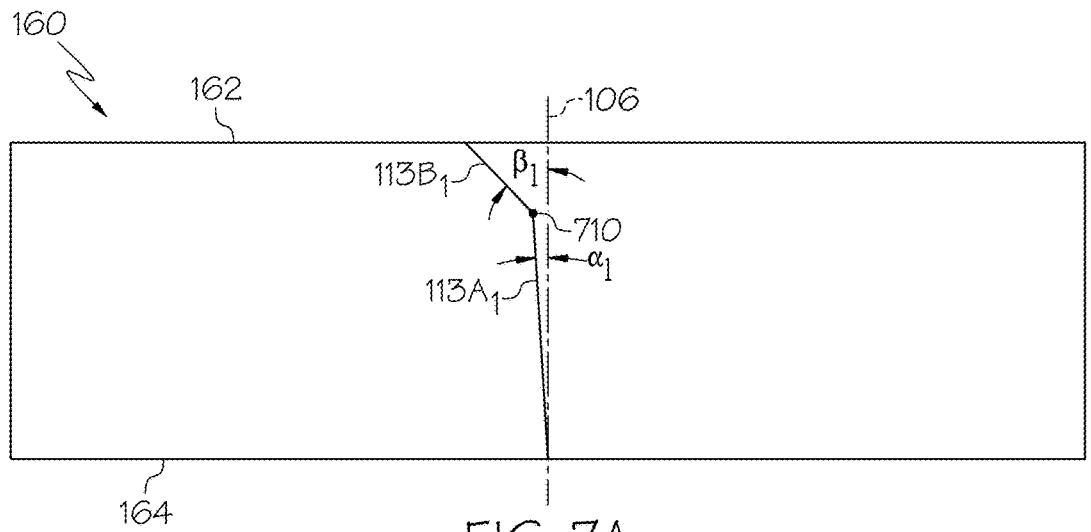
FIG. 7A schematically depicts a side view of a transparent workpiece and a laser beam focal line, according to one or more embodiments described herein.

The optical blocking element 610A-C may be used to block the second set of rays 520 (as shown in FIGS. 5A and 6A), or to block the first set of rays 510 (as shown in FIGS. 5B and 6B). Referring to FIGS. 5A, 6A, and 7A specifically, in embodiments where the average radius $r_2$ of the second segment 550A is less than an average radius $r_1$ of the first segment 540A and the phase mask 150A is applied, which obstructs the second set of rays 520 with the optical blocking element 610A, the first set of rays 510 may form a first portion 113A$_1$ of the laser beam focal line 113. The first portion 113A$_1$ of the laser beam focal line 113 begins at an origin point 710 within the transparent workpiece 160. As used throughout this disclosure, the term "origin point" refers to the origin of the region of induced absorption for at least a portion of the laser beam focal line 113. The region of induced absorption controls the location and length of the defect formed by the processes disclosed herein. Therefore, the "origin point" as defined herein, may ultimately be the origin point for at least a portion of the defect within the transparent workpiece 160. For a fixed position of workpiece 160 relative to a fixed optical system, the position of origin point 710 is controlled by the diameter of the optical blocking element 610A; a larger diameter positions origin point 710 further away from impingement surface 162.

The second set of rays 520 may be configured by phase-altering optical element 120 such that, if unobstructed, the second set of rays 520 would form a second portion 113B$_1$ of the laser beam focal line 113 extending from impingement surface 162 up to the origin point 710 in a beam propagation direction. In embodiments, the first portion 113A$_1$ of the laser beam focal line 113 formed by the first set of rays 510 may comprise an internal focal line angle $\alpha_1$ of from 0° to 10° or from 170° to 180° relative to the orthogonal plane 106 relative to the opposite surface 164. If blocking element 610A were removed, laser beam focal line 113A and laser beam focal line $113B_1$ would form simultaneously.

In embodiments where the average radius $r_2$ of the second segment 550A is less than an average radius $r_1$ of the first segment 540A and the phase mask 150B is applied, which obstructs the first set of rays 510 with the optical blocking element 610B, the second set of rays 520 may form a second portion $113B_1$ of the laser beam focal line 113 extending up to the origin point 710 in a direction defined by internal focal line angle $\beta_1$. Laser beam focal line $113B_1$ may initiate at, upstream of or downstream of impingement surface 162. The size of the opening of optical blocking element 610B controls the length of the laser beam focal line $113B_1$; a larger opening leads to a longer laser beam focal line $113B_1$. The laser beam focal line $113B_1$ may comprise an internal focal line angle $\beta_1$ of greater than 10° and less than 80° or of greater than 100° and less than 170° relative to the orthogonal plane 106 relative to the impingement surface 162.

Figure 7B:
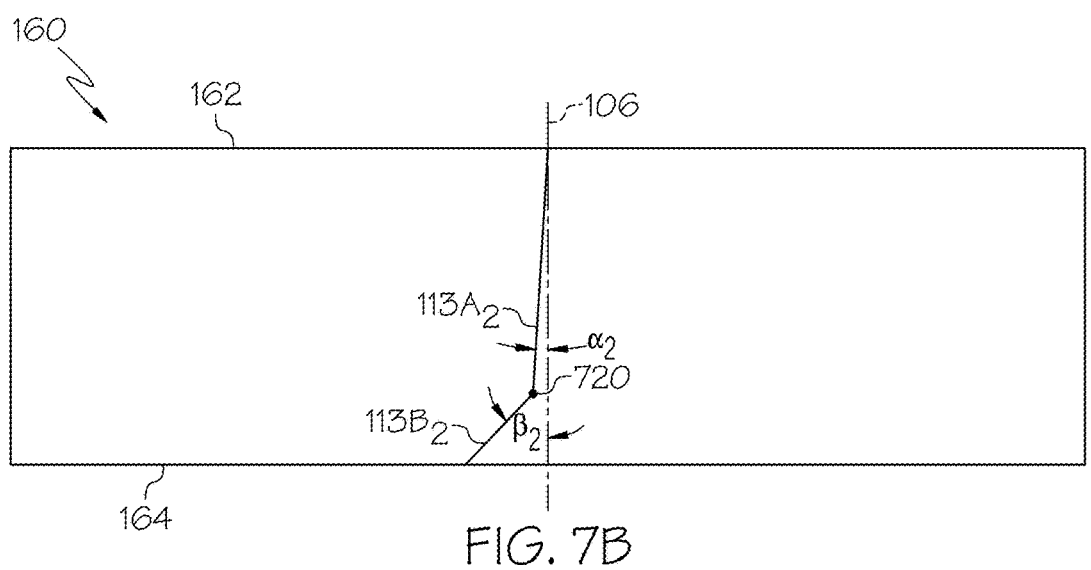
FIG. 7B schematically depicts a side view of a transparent workpiece and a laser beam focal line, according to one or more embodiments described herein.
Figure 7C:
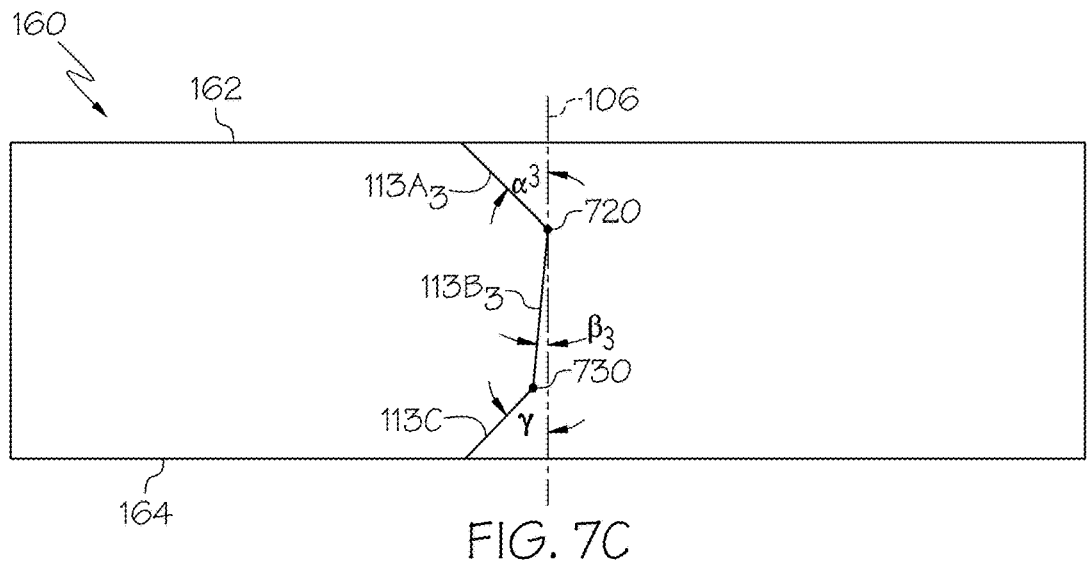
FIG. 7C schematically depicts a side view of a transparent workpiece and a laser beam focal line, according to one or more embodiments described herein.

Referring to FIGS. 5B, 6B, and 7B specifically, in other embodiments, the first set of rays 510 may define a first segment 540B of the laser beam 112 and the second set of rays may 520 define a second segment 550B of the laser beam 112, where an average radius $r_2$ of the second segment 550B may be greater than an average radius $r_1$ of the first segment 540B, meaning that the first segment 540B is positioned within the second segment 550B. In embodiments where the average radius $r_2$ of the second segment 550B is greater than an average radius $r_1$ of the first segment 540B and the phase mask 150B is applied, which obstructs the second set of rays 520 with the optical blocking element 610B, the first set of rays 510 may form a laser beam focal line $113A_2$ that extends from, upstream from, or downstream from impingement surface 162 to a termination point 720 within the transparent workpiece 160. As used throughout this disclosure, the term "termination point" refers to the termination point of the region of induced absorption for at least a portion of the laser beam focal line 113. Similar to the origin point previously described, the "termination point" as defined herein, may ultimately be the termination point for at least a portion of the defect within the transparent workpiece 160. The second set of rays 520 may be configured by phase-altering optical element 120 such that, if unobstructed, the second set of rays 520 would form a second portion $113B_2$ of the laser beam focal line 113 that extends beyond the termination point 720 in a direction defined by internal focal line angle $\beta_2$. If blocking element 610B were removed, laser beam focal line $113A_2$ and laser beam focal line $113B_2$ would form simultaneously. In embodiments, the first portion $113A_2$ of the laser beam focal line 113 formed by the first set of rays 510 may comprise an internal focal line angle $\alpha_2$ of from 0° to 10° or from 170° to 180° relative to the orthogonal plane 106 relative to the impingement surface 162.

In embodiments where an average radius $r_2$ of the second segment 550B is greater than an average radius $r_1$ of the first segment 540B and the phase mask 150A is applied, which obstructs the first set of rays 510 with the optical blocking element 610A, the second set of rays 520 may form a second portion $113B_2$ of the laser beam focal line 113 extending beyond the termination point 720 in a direction defined by internal focal line angle $\beta_2$. Laser beam focal line $113B_2$ may extend partway to, all the way to, or beyond opposite surface 164. The laser beam focal line $113B_2$ may comprise an internal focal line angle $\beta_2$ of greater than 100 and less than 80° or of greater than 100° and less than 170° relative to the orthogonal plane 106 relative to the impingement surface 164.

Figure 5C:
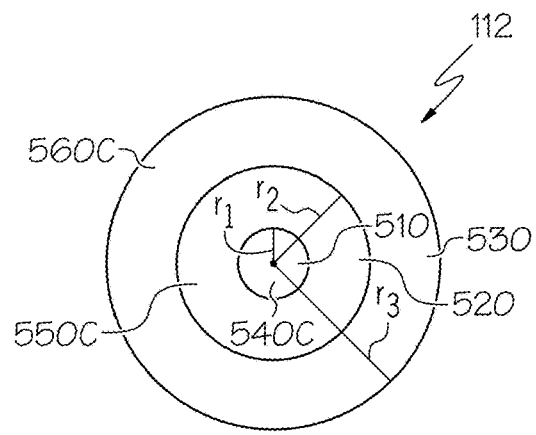
FIG. 5C schematically depicts a cross-section of a laser beam, according to one or more embodiments described herein.

Referring to FIGS. 5C, 6A-C, and 7C specifically, the laser beam 112 may comprise a first set of rays 510, a second set of rays 520, and a third set of rays 530, as shown in FIG. 5C. In embodiments, the first set of rays 510, the second set of rays 520, the third set of rays 530, or combinations thereof may be obstructed with an optical blocking element, including, but not limited to, the example optical blocking elements 610A-C. It is contemplated that more than three optical blocking elements may be used, and that the optical blocking elements may be of any shape. In embodiments, the first set of rays 510, the second set of rays 520, and the third set of rays 530 may form a first segment 540C (an exemplary circular segment), a second segment 550C (an exemplary annular segment), and a third segment 560C (an exemplary annular segment), respectively, as shown in FIG. 5C. In embodiments, an average radius $r_1$ of the first segment 540C may be less than an average radius $r_2$ of the second segment 550C, and the average radius $r_2$ of the second segment 550C may be less than an average radius $r_3$ of the third segment 560C. This means that the first segment 540C is positioned within the second segment 550C, and the second segment 550C is positioned within the third segment 560C. In embodiments, the second set of rays 520 may comprise a portion of the third set of rays 530, or the third set of rays 530 may comprise a portion of the second set of rays 520.

Continuing to refer to FIGS. 5C, 6A-C, and 7C specifically, in embodiments, the first set of rays 510 may be configured by phase-altering optical element 120 such that, if unobstructed, the first set of rays 510 form a first portion $113A_3$ of the laser beam focal line 113 that terminates at a termination point 720. The second set of rays 520 may be configured by phase-altering optical element 120 such that, if unobstructed, the second set of rays 520 form a second portion $113B_3$ of the laser beam focal line 113 that extends beyond the termination point 720 in a beam propagation direction and terminates at a second termination point 730 within the transparent workpiece 160. The third set of rays 530 may be configured by phase-altering optical element 120 such that, if unobstructed, the third set of rays 530 form a third portion 113C of the laser beam focal line 113 extending beyond the second termination point 730 in a beam propagation direction. The laser beam focal line $113A_3$ may comprise an internal focal line angle a of greater than 10° and less than 80° or of greater than 100° and less than 170° relative to the orthogonal plane 106 relative to the impingement surface 162. The laser beam focal line $113B_3$ may comprise an internal focal line angle $\beta_3$ of greater than 0° and less than 10° or of greater than 170° and less than 180° relative to the orthogonal plane 106 relative to the impingement surface 162. The laser beam focal line 113C may comprise an internal focal line angle $\gamma$ of greater than 10° and less than 80° or of greater than 100° and less than 170° relative to the orthogonal plane 106 relative to the impingement surface 162.

Referring now to FIGS. 1A through 4B, laser beams 112 may be used to form high angle defects 172 in the transparent workpiece 160 when the impingement surface 162 comprises a planar topography. However, in other embodiments, the impingement surface 162 may comprise a non-planar topography, such as a surface having a curved topography, a jagged topography, or an arbitrary, non-planar topography. When the impingement surface 162 comprises a non-planar topography, the phase-altering optical element 120 may apply a phase alteration to the laser beam 112 such that the laser beam 112 upstream and/or incident the impingement surface 162 (such as in free space) comprises a non-circular angular spectrum corresponding with the non-planar topography such that the portion of the laser beam focal line 113 within the transparent workpiece comprises a circular angular spectrum and exhibits a quasi-non-diffracting character.

As one example, when the impingement surface 162 is a consistent, non-planar surface (such as a consistent, curved surface) the phase alteration may be applied by the adaptive phase-altering optical element 122 or the static phase-altering optical element 123. For example, the phase alteration may be applied by a static phase-altering optical element 123 comprising a non-circular axicon having a base portion and a conical portion extending from the base portion, where the base portion comprises a non-circular perimeter such that the phase alteration applied to the laser beam 112 by the non-circular axicon forms a non-circular angular spectrum corresponding with the consistent, curved topography of the impingement surface 162 such that the portion of the laser beam focal line 113 within the transparent workpiece 160 comprises a circular angular spectrum, exhibits a quasi-non-diffracting character, and has phase-matched intersecting rays at each position along its length.

In some embodiments, the impingement surface 162 comprises a non-planar topography that is not consistent. For example, the impingement surface 162 may comprise a "variable topography," which, as used herein, refers to a surface having at least two local topographies that comprise an angular difference of 10% or more, where "local topography" refers to the shape of a surface of the transparent workpiece 160, such as the impingement surface 162, at a specific location on the surface. When the impingement surface 162 comprises a variable topography, the adaptive phase-altering optical element 122 may apply a phase alteration to the laser beam 112 such that the laser beam 112 upstream and/or incident the impingement surface 162 (such as in free space) comprises an arbitrary non-circular angular spectrum corresponding with the local topography at the impingement location 115 such that the portion of the laser beam focal line 113 within the transparent workpiece 160 comprises a circular angular spectrum, exhibits a quasi-non-diffracting character, and has phase-matched intersecting rays at each position along its length. In particular, the controller 121 may provide control signals to the adaptive phase-altering optical element 122 to apply a phase alteration to the laser beam 112, such that the laser beam 112 comprises a non-circular angular spectrum. Moreover, the controller 121 may apply different phase functions over time to the adaptive phase-altering optical element 122. In particular, the controller 121 may actively alter the phase function applied by the adaptive phase-altering optical element 122.

Referring again to FIGS. 1A-4B, in operation, the laser beam 112 may be translated relative to the transparent workpiece 160 (e.g., in the translation direction 101) along the contour line 165 to form the plurality of defects 172 of the contour 170. Directing or localizing the laser beam 112 into the transparent workpiece 160 generates an induced absorption within the transparent workpiece 160 and deposits enough energy to break chemical bonds in the transparent workpiece 160 at spaced locations along the contour line 165 to form the defects 172, each comprising a defect angle $\theta_d$ that is greater than 10°. According to one or more embodiments, the laser beam 112 may be translated across the transparent workpiece 160 by motion of the transparent workpiece 160 (e.g., motion of a translation stage 190 coupled to the transparent workpiece 160, as shown in FIGS. 2A and 2B), motion of the laser beam 112 (e.g., motion of the laser beam focal line 113), or motion of both the transparent workpiece 160 and the laser beam focal line 113.

Furthermore, when the impingement surface 162 of the transparent workpiece 160 comprises a variable topography, the laser beam 112 may be translated along the contour line 165 from a first impingement location comprising a first local topography to a second impingement location comprising a second local topography, and thereafter to a plurality of additional impingement locations, each comprising local topographies, some or all of which may be distinct from one another. Laser processing a transparent workpiece 160 having an impingement surface 162 with variable topography may comprise directing the laser beam 112 into the transparent workpiece 160 at the first impingement location after applying a first phase alteration to the laser beam 112 using the adaptive phase-altering optical element 122 (such as the spatial light modulator) such that the laser beam 112 would comprise a first non-circular angular spectrum in free space, translating the laser beam 112 from the first impingement location to the second impingement location, and directing the laser beam 112 into the transparent workpiece 160 at the second impingement location after applying a second phase alteration to the laser beam 112 using the adaptive phase-altering optical element 122 such that the laser beam 112 would comprise a second non-circular angular spectrum in free space.

The first phase alteration and the first non-circular angular spectrum correspond with the first local topography at the first impingement location such that the portion of the laser beam 112 directed into the transparent workpiece 160 at the first impingement location at a beam propagation angle $\theta_{bp}$ comprises a laser beam focal line 113 having an internal beam angle of greater than 10° while being quasi non-diffracting and having phase-matched intersecting rays at each position along its length. Similarly, the second phase alteration corresponds with the second local topography such that the portion of the laser beam 112 directed into the transparent workpiece 160 at the second impingement location at a beam propagation angle $\theta_b$p comprises a laser beam focal line 113 having an internal beam angle of greater than 10° while being quasi non-diffracting and having phase-matched intersecting rays at each position along its length. Thus, the laser beam focal line 113 forms a first defect having a defect angle $\theta_d$ that is greater than 10° and a second defect having a defect angle $\theta_d$ that is greater than 10°.

Referring again to FIG. 2A, the optical assembly 100 may further comprise an imaging system 192 configured to generate image data of the impingement surface 162. In some embodiments, the imaging system 192 may comprise one or more cameras, physical surface probes, laser rangefinders, interferometric systems, wavefront sensors, or the like. The imaging system 192 is communicatively coupled to the controller 121 such that the imaging system 192 may send image data of the impingement surface 162 to the controller 121, and the controller 121 may instruct the adaptive phase-altering optical element 122 to apply specific phase alterations to the laser beam 112 corresponding with the local topography of impingement locations on the impingement surface 162.

Thus, laser processing a transparent workpiece 160 having an impingement surface 162 with variable topography may further comprise imaging the impingement surface 162 using the imaging system 192 to generate image data of the impingement surface 162. Using this image data, the imaging system 192, the controller 121, or another computing device may determine the local topography of the first impingement location and the local topography of the second impingement location and determine the particular phase alterations that will form a high angle, quasi-non-diffracting laser beam focal line 113 in the transparent workpiece 160 that have phase-matched intersecting rays at each position along its length. The method further comprises instructing the adaptive phase-altering optical element 122, using the controller 121, to apply the first phase alteration when directing the laser beam 112 into the impingement surface 162 at the first impingement location and apply the second phase alteration when direction the laser beam 112 into the impingement surface 162 at the second location. Further, the image data may be used to determine the topography of some or all of impingement surface 162, thereby determining a plurality of local topographies of a plurality of impingement locations.

Referring again to FIGS. 1A-4B, the defects 172 may generally be spaced apart from one another by a distance along the contour 170 of from about 0.1 µm to about 500 µm, for example, about 1 µm to about 200 µm, about 2 µm to about 100 µm, about 5 µm to about 20 µm, or the like. For example, suitable spacing between the defects 172 may be from about 0.1 µm to about 50 µm, such as from about 5 µm to about 15 µm, from about 5 µm to about 12 µm, from about 7 µm to about 15 µm, or from about 7 µm to about 12 µm for the TFT/display glass compositions. In some embodiments, a spacing between adjacent defects 172 may be about 50 µm or less, 45 µm or less, 40 µm or less, 35 µm or less, 30 µm or less, 25 µm or less, 20 µm or less, 15 µm or less, 10 µm or less, or the like.

As illustrated in FIGS. 1A and 1, the plurality of defects 172 of the contour 170 extend into the transparent workpiece 160 and establish a path for crack propagation for separation of the transparent workpiece 160 into separate portions along the contour 170. Forming the contour 170 comprises translating the laser beam 112 relative to the transparent workpiece 160 (e.g., in the translation direction 101) along the contour line 165 to form the plurality of defects 172 of the contour 170. According to one or more embodiments, the laser beam 112 may be translated across the transparent workpiece 160 by motion of the transparent workpiece 160, motion of the laser beam 112 (e.g., motion of the laser beam focal line 113), or motion of both the transparent workpiece 160 and the laser beam 112, for example, using one or more translation stages 190 (FIGS. 2A and 2B). By translating the laser beam focal line 113 relative to the transparent workpiece 160, the plurality of defects 172 may be formed in the transparent workpiece 160, wherein each of the plurality of defects 172 comprises a defect angle $\theta_d$ that is greater than 10°.

Suitable laser wavelengths for forming defects 172 are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the beam propagation direction of the laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour 170 (FIGS. 1A and 1B) may utilize the beam source 110 (e.g., a pulsed beam source such as an ultra-short pulse laser) in combination with the phase-altering optical element 120, the first lens 131, and the second lens 132, to irradiate the transparent workpiece 160 and generate the laser beam focal line 113. The laser beam focal line 113 comprises a quasi-non-diffracting beam, such as a Gauss-Bessel beam or Bessel beam, as defined above, and may fully or partially perforate the transparent workpiece 160 to form defects 172, each comprising a defect angle $\theta_d$ that is greater than 10°, in the transparent workpiece 160, which may form the contour 170. In embodiments in which the laser beam 112 comprises a pulsed laser beam, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

Referring now to FIGS. 8A and 8B, in addition to a single pulse operation at the aforementioned individual pulse repetition rates, in embodiments comprising a pulsed laser beam, the pulses may be produced in pulse bursts 500 of two sub-pulses 500A or more (such as, for example, 3 sub-pulses, 4 sub-pulses, 5 sub-pulses, 10 sub-pulses, 15 sub-pulses, 20 sub-pulses, or more per pulse burst, such as from 1 to 30 sub-pulses per pulse burst 500, or from 5 to 20 sub-pulses per pulse burst 500). While not intending to be limited by theory, a pulse burst is a short and fast grouping of sub-pulses that creates an optical energy interaction with the material (i.e. MPA in the material of the transparent workpiece 160) on a time scale not easily accessible using a single-pulse operation. While still not intending to be limited by theory, the energy within a pulse burst (i.e. a group of pulses) is conserved. As an illustrative example, for a pulse burst having an energy of 100 µJ/burst and 2 sub-pulses, the 100 µJ/burst energy is split between the 2 pulses for an average energy of 50 µJ per sub-pulse and for a pulse burst having an energy of 100 µJ/burst and 10 sub-pulses, the 100 µJ/burst is split amongst the 10 sub-pulses for an average energy of 10 µJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the transparent workpiece 160.

While still not intending to be limited by theory, when the defects 172 of the one or more contours 170 are formed with pulse bursts having at least two sub-pulses, the force necessary to separate the transparent workpiece 160 along the contour 170 (i.e. the maximum break resistance) is reduced compared to the maximum break resistance of a contour 170 with the same spacing between adjacent defects 172 in an identical transparent workpiece 160 that is formed using a single pulse laser. For example, the maximum break resistance of a contour 170 formed using a single pulse is at least two times greater than the maximum break resistance of a contour 170 formed using a pulse burst having 2 or more sub-pulses. Further, the difference in maximum break resistance between a contour 170 formed using a single pulse and a contour 170 formed using a pulse burst having 2 sub-pulses is greater than the difference in maximum break resistance between a contour 170 formed using a pulse burst having 2 sub-pulses and a pulse burst having 3 sub-pulses. Thus, pulse bursts may be used to form contours 170 that separate easier than contours 170 formed using a single pulse laser.

Referring still to FIGS. 8A and 8B, the sub-pulses 500A within the pulse burst 500 may be separated by a duration that is in a range from about 1 nsec to about 50 nsec, for example, from about 10 nsec to about 30 nsec, such as about 20 nsec. In other embodiments, the sub-pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ (FIG. 8B) between adjacent sub-pulses 500A within a pulse burst 500 may be relatively uniform (e.g., within about 10% of one another). For example, in some embodiments, each sub-pulse 500A within a pulse burst 500 is separated in time from the subsequent sub-pulse by about 20 nsec (50 MHz). Further, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 6B) is about 5 microseconds for the beam source 110 outputting a laser beam 112 comprising a burst repetition rate of about 200 kHz. The laser burst repetition rate is related to the time $T_b$ between the first pulse in a burst to the first pulse in the subsequent burst (laser burst repetition rate=1/$T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and, in some embodiments, $T_d$≤15 psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of sub-pulses 500A is not in a uniform and steady stream but rather in tight clusters of pulse bursts 500. The pulse burst laser beam may have a wavelength selected based on the material of the transparent workpiece 160 being operated on such that the material of the transparent workpiece 160 is substantially transparent at the wavelength. The average laser power per burst measured at the material may be at least about 40 µJ per mm of thickness of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 µJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 160 is the pulse energy, which may be described in terms of pules burst energy (i.e., the energy contained within a pulse burst 500 where each pulse burst 500 contains a series of sub-pulses 500A), or in terms of the energy contained within a single laser pulse (many of which may comprise a burst). The pulse energy (for example, pulse burst energy) may be from about 25 µJ to about 750 µJ, e.g., from about 50 µJ to about 500 µJ, or from about 50 µJ to about 250 µJ. For some glass compositions, the pulse energy (e.g., pulse burst energy) may be from about 100 µJ to about 250 µJ. However, for display or TFT glass compositions, the pulse energy (e.g., pulse burst energy) may be higher (e.g., from about 300 µJ to about 500 µJ, or from about 400 µJ to about 600 µJ, depending on the specific glass composition of the transparent workpiece 160).

The portion of the laser beam 112 directed into the transparent workpiece 160 may comprise a persistent intensity homogeneity. As used herein, the term "persistent intensity homogeneity" means that an intensity of the laser beam at any discrete point throughout the portion of the laser beam directed into the transparent workpiece does not vary by more than 50% from the intensity of the laser beam at any second discrete point throughout the portion of the laser beam directed into the transparent workpiece. In the embodiments described in this disclosure, the persistent intensity homogeneity of the laser beam throughout the portion of the laser beam directed into the transparent workpiece is such that, for a discrete point throughout the portion of the laser beam directed into the transparent workpiece, the extrema (i.e., the minimum or maximum) of the intensity of the laser beam is greater than or equal to about 50% and less than or equal to about 150% of the intensity of the laser beam at any second discrete point throughout the portion of the laser beam directed into the transparent workpiece.

Figure 8C:
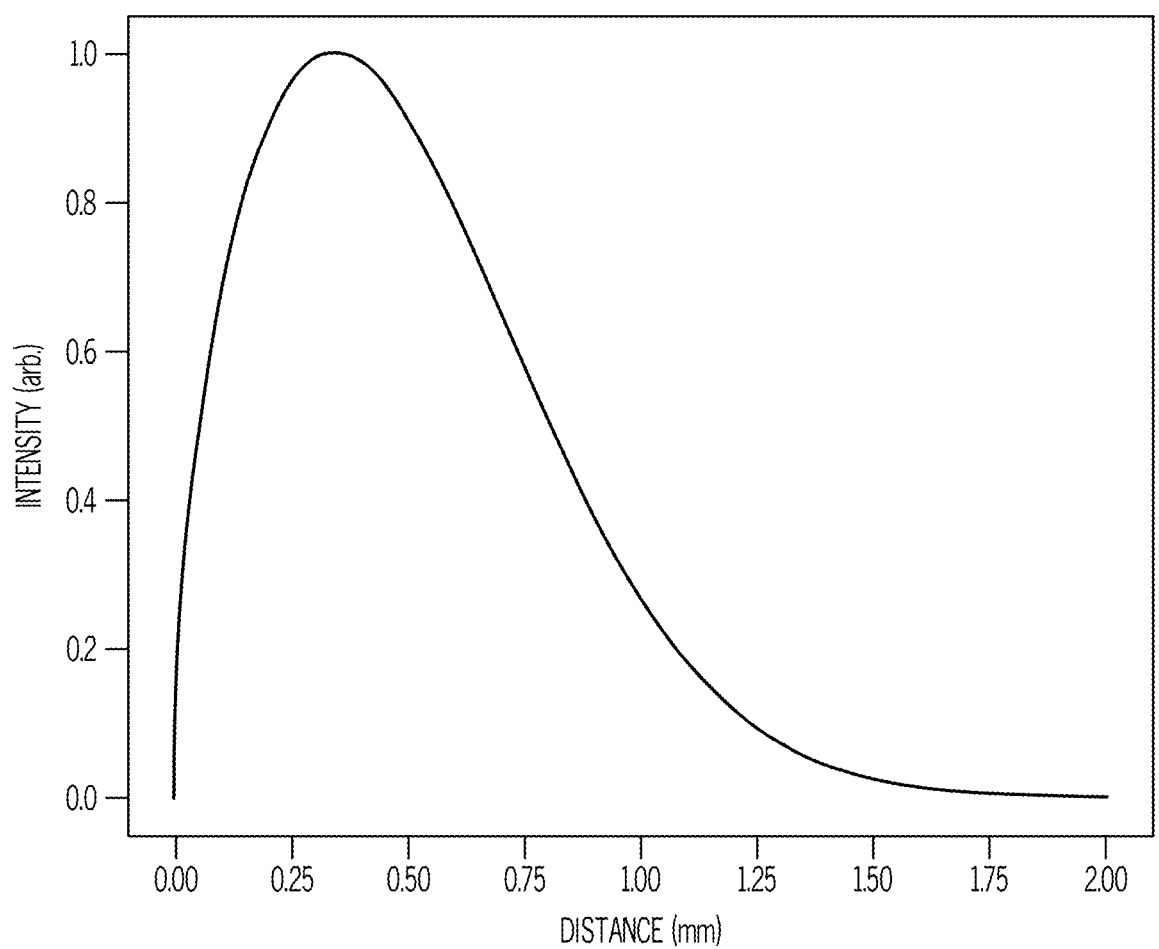
FIG. 8C graphically depicts intensity of laser pulses vs. distance, according to one or more embodiments described herein.

An example intensity distribution of the laser beam focal line 113 over distance is shown in FIG. 8C. Without intending to be bound by theory, it may be beneficial to place the impingement surface 162 of the transparent workpiece 160 greater than or equal to 0.05 mm, greater than or equal to 0.08 mm, greater than or equal to 0.10 mm, greater than or equal to 0.12 mm, greater than or equal to 0.15 mm, greater than or equal to 0.18 mm, or greater than or equal to 0.20 mm downstream the formation of the laser beam focal line 113, such that the laser beam focal line 113 comprises an external laser beam focal line 117 as previously described. Placing the impingement surface 162 of the transparent workpiece 160 downstream from the formation of the laser beam focal line 113 may result in a greater laser beam 112 intensity at the impingement surface 162, ensuring that the internal defect plane connects with the impingement surface 162. Additionally, to ensure that the laser beam focal line 113 exhibits a quasi-non-diffracting character in the free space upstream the impingement surface 162 of the transparent workpiece 160, the external laser beam focal line 117 may comprise a circular or approximately circular angular spectrum as previously described.

While not intending to be limited by theory, the use of a laser beam 112 comprising a pulsed laser beam capable of generating pulse bursts is advantageous for cutting or modifying transparent materials, for example glass (e.g., the transparent workpiece 160). In contrast with the use of single pulses spaced apart in time by the repetition rate of the single-pulsed laser, the use of a burst sequence that spreads the pulse energy over a rapid sequence of pulses within the burst allows access to larger timescales of high intensity interaction with the material than is possible with single-pulse lasers. The use of pulse bursts (as opposed to a single pulse operation) increases the size (e.g., the cross-sectional size) of the defects 172, which facilitates the connection of adjacent defects 172 when separating transparent workpiece 160 along the one or more contours 170, thereby minimizing unintended crack formation. Further, using a pulse burst to form defects 172 increases the randomness of the orientation of cracks extending outward from each defect 172 into the bulk material of the transparent workpiece 160 such that individual cracks extending outward from defects 172 do not influence or otherwise bias the separation of the contour 170 such that separation of the defects 172 follows the contour 170, minimizing the formation of unintended cracks.

Referring again to FIGS. 2A and 2B, the optical assembly 100 may be configured to further alter the laser beam 112 such that a cross-section of the laser beam 112 at the impingement surface 162 of the transparent workpiece 160 is non-axisymmetric and thus a cross-section of the laser beam focal line 113 is non-axisymmetric, for example, using the methods and systems described in U.S. Published Patent Application No. 20180093941A1, hereby incorporated by reference in its entirety. For example, the beam spot 114 formed by the laser beam focal line 113 at the impingement surface 162 the transparent workpiece 160 may comprise a non-axisymmetric beam spot having a long axis and a short axis such that the defects 172 formed using this laser beam focal line 113 comprise a central defect region formed at the intersection of the long axis and the short axis and one or more radial arms formed in the direction of the long axis These defects 172 are formed using a laser beam focal line 113 having a non-axisymmetric beam spot oriented such that the long axis of the beam spot 114 extends along the contour line 165 thereby forming defects 172 with radial arms that extend along the contour line 165. By controlling the laser beam focal line 113 such that the direction of the radial arms of each defect 172 extends along the contour line 165, crack propagation may be better controlled.

In embodiments in which the phase-altering optical element 120 comprises the adaptive phase-altering optical element 122, a laser beam focal line 113 with a cross-section that is non-axisymmetric may be formed by altering the phase modulation applied by the adaptive phase-altering optical element 122. Further, as described in described in U.S. Published Patent Application No. 20180093941A1, in embodiments in which the phase-altering optical element 120 comprises a static phase-altering optical element 123 (e.g., the oblong axicon 124), the laser beam focal line 113 with a cross-section that is non-axisymmetric may be formed by positioning the axicon offset in a radial direction from the beam pathway 111, blocking a portion of the laser beam 112, or decohering a portion of the laser beam using a phase delay plate.

Referring again to FIGS. 1A-4B, in some embodiments, the transparent workpiece 160 may be further acted upon in a subsequent separating step to induce separation of the transparent workpiece 160 along the contour 170 to form a separated transparent article comprising an angled edge (FIGS. 9A-11B). The subsequent separating step may include using mechanical force, thermal stress induced force, or a chemical etchant to propagate a crack along the contour 170. The thermal source, such as an infrared laser beam, may be used to create thermal stress and thereby separate the transparent workpiece 160 along the contour 170. Separating the transparent workpiece 160 may include directing an infrared laser beam at the contour 170 to induce thermal stress to propagate a crack along the contour 170. In some embodiments, the infrared laser beam may be used to initiate separation and then the separation may be finished mechanically. Without being bound by theory, the infrared laser is a controlled heat source that rapidly increases the temperature of the transparent workpiece 160 at or near the contour 170. This rapid heating may build compressive stress in the transparent workpiece 160 on or adjacent to the contour 170. Since the area of the heated glass surface is relatively small compared to the overall surface area of the transparent workpiece 160, the heated area cools relatively rapidly. The resultant temperature gradient induces tensile stress in the transparent workpiece 160 sufficient to propagate a crack along the contour 170 and through the depth of the transparent workpiece 160, resulting in full separation of the transparent workpiece 160 along the contour 170. Without being bound by theory, it is believed that the tensile stress may be caused by expansion of the glass (i.e., changed density) in portions of the workpiece with higher local temperature.

Suitable infrared lasers to create thermal stress in glass would typically have wavelengths that are readily absorbed by glass, typically having wavelengths ranging from 1.2 µm to 13 µm, for example, a range of 4 µm to 12 µm. Further, the power of the infrared laser beam may be from about 10 W to about 1000 W, for example 100 W, 250 W, 500 W, 750 W, or the like. Moreover, the $1/e^2$ beam diameter of the infrared laser beam may be about 20 mm or less, for example, 15 mm, 12 mm, 10 mm, 8 mm, 5 mm, 2 mm, or less. In operation, a larger $1/e^2$ beam diameter of the infrared laser beam may facilitate faster laser processing and more power while a smaller $1/e^2$ beam diameter of the infrared laser beam may facilitate high precision separation by limiting damage to portions of the transparent workpiece 160 near the contour 170. Example infrared lasers include a carbon dioxide laser (a "$CO_2$ laser"), a carbon monoxide laser (a "CO laser"), a solid state laser, a laser diode, or combinations thereof.

In other embodiments, stress present in the transparent workpiece 160, depending on the type, depth, and material properties (e.g., absorption, CTE, stress, composition, etc.) may cause spontaneous separation along the contour 170 without further heating or mechanical separation steps. For example, when the transparent workpiece 160 comprises a strengthened glass substrate (e.g., an ion-exchanged or thermally tempered glass substrate), the formation of the contour 170 may induce crack propagation along the contour 170 to separate the transparent workpiece 160.

Referring now to FIGS. 9A-11B example transparent workpieces 260, 360, 460 and resultant separated articles 260', 360', 460' formed from these transparent workpieces using the methods and systems described herein are schematically depicted. As one example, FIG. 9A depicts a schematic side view of a transparent workpiece 260 with a plurality of defects 272 each having a defect angle $\theta_d$ that is greater than 10°. The plurality of defects 272 (i.e., a contour of these defects 272) may be separated to form one or more separated articles 260' each comprising an angled edge 261, as shown in FIG. 9B.

As another example, FIG. 10A depicts a schematic side view of a transparent workpiece 360 comprising a plurality of defects, including a first defect 372a and a second defect 372b. The plurality of defects comprise a curved contour formed along a curved contour line. Both the first defect 372a and the second defect 372b extend radially inward, for example, from an impingement surface 362 (i.e., the top surface depicted in FIG. 10A) to an opposite surface 364 (i.e., the bottom surface depicted in FIG. 10B). Thus, at the impingement surface 362, the first defect 372a and the second defect 372b are spaced apart from one another by a first spacing distance $D_{S1}$ and at the opposite surface 364, the first defect 372a and the second defect 372b are spaced apart from one another by a second spacing distance $D_{S2}$, which is smaller than the first spacing distance $D_{S1}$. In embodiments in which the curved contour line is circular, the first spacing distance $D_{S1}$ is the diameter of the closed contour line at the impingement surface and the second spacing distance $D_{S2}$ is the diameter of the closed contour line at the opposite surface. As shown in FIG. 10B, the closed contour of defects may be separated to form a separated article 360' having a conical hole 363 defined by an angled edge 361. For example, the closed contour of defects may be separated to form the separated article 360' having the conical hole 363 using a chemical etching process.

Referring still to FIGS. 10A and 10B, the curved contour of defects may be formed by rotating the laser beam 112 about the beam pathway 111 while translating the transparent workpiece 160 and the laser beam 112 relative to one another such that the defects retain a radially inward directionality relative to the curved contour line along the curved contour. Further, it should be understood that while the defects are depicted as being directed radially inward relative to the curved contour line, in other embodiments, the defects may be directed radially outward, for example, by rotation of the laser beam 112 about the beam pathway 111.

As another example, FIG. 11A depicts a schematic side view of a transparent workpiece 460 comprising a plurality of defects 472, including a first defect 472a, a second defect 472b, and a third defect 472c. The first defect 472a extends from an impingement surface 462 to a first end of the second defect 472b, the second defect 472b extends from an end of the first defect 472a to an end of the third defect 472c, and the third defect 472c extends from a second end of the second defect 472b to the edge surface 466. The first defect 472a may be formed by directing the laser beam focal line 113, at an angle, from the impingement surface 462 to the edge surface 466, the second defect 472b may be formed by directing the laser beam focal line 113 from the end of the first defect 472a to the end of the third defect 472c, and the third defect 472c may be formed by directing the laser beam focal line 113, at an angle, from the opposite surface 464 to the edge surface 466. Further, the first defect 472a may be part of a plurality of first defects 472a that from a first contour, the second defect 472b may be part of a plurality of second defects 472b that form a second contour, and the third defect 472c may be part of a plurality of third defects 472c that form a third contour. In operation, the first contour of first defects 472a, the second contour of second defects 472b, and the third contour of third defects 472c may be separated using the embodiments describe herein to form a separated article 460' having chamfered edge 468, as depicted in FIG. 11B.

EXAMPLES

A transparent workpiece was passed under a pulsed laser beam with a wavelength of 1064 nm, pulse energy 200 to 800 µJ, a repetition rate of 60 kHz, and a pulse width of 10 ps. The laser had a variable burst-mode, capable of creating a burst of laser pulses with 12.5 ns spacing between each pulse in the burst. The number of pulses in a burst could be varied from 1 to 20. The pulsed laser beam was reflected off a spatial light modulator to add the phase of a specially-shaped axicon. The laser beam was then passed through four lenses in a telescopic configuration with a total demagnification of about 20× to form a laser beam focal line that contacted the transparent workpiece. The last lens (i.e., the most downstream lens) had a numerical aperture of about 0.4.

To perforate and cut a sample, the transparent workpiece was tilted 40° with respect to the beam propagation direction and moved in the Y direction with a speed such that there was an 8-µm pitch between each pulse. The 40° tilt resulted in an internal focal line angle of 26° inside the glass substrate due to refraction.

Figure 12:
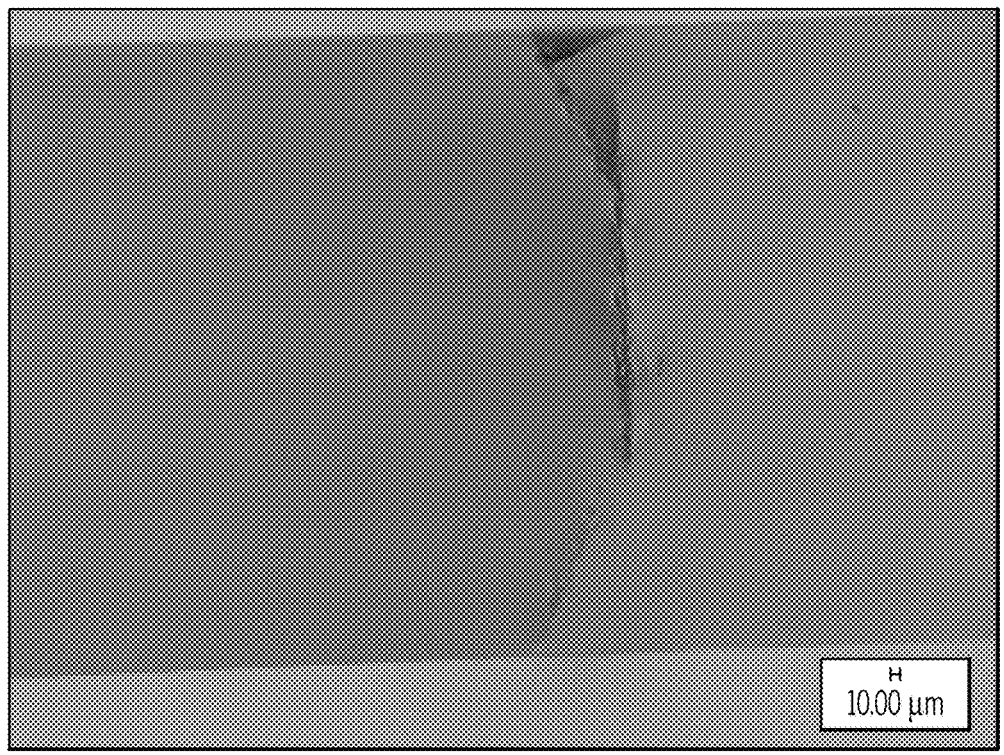
FIG. 12 pictorially depicts a side view of a defect formed in a transparent workpiece, according to one or more embodiments shown and described herein.

The beam was passed over the sample three times to form a C-chamfer (of the type shown in FIG. 11A). For the first pass, the transparent workpiece was tilted at 40° with respect to the beam propagation direction. For the second pass, the transparent workpiece was tilted at 0° with respect to the beam propagation direction. For the third pass, the transparent workpiece was tilted at −40° with respect to the beam propagation direction. Care was taken to ensure that the bottom portion of the damage was made first, followed by the middle portion, and lastly the top portion, to ensure that beams do not have to pass through a previous damage plane; scattering from these planes can result in reduced sample damage. FIG. 12 is an image of the cross section of a glass piece damaged in this way.

Figure 13:
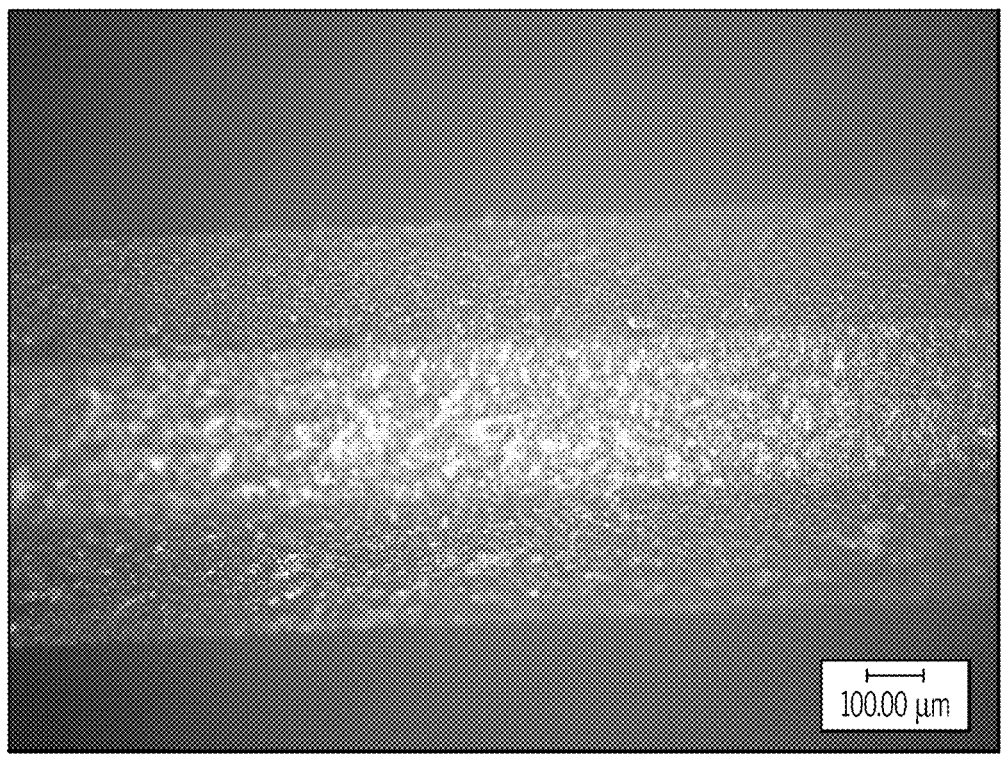
FIG. 13 pictorially depicts a side view of the defect formed in the transparent workpiece of FIG. 12, according to one or more embodiments shown and described herein.
Figure 14:
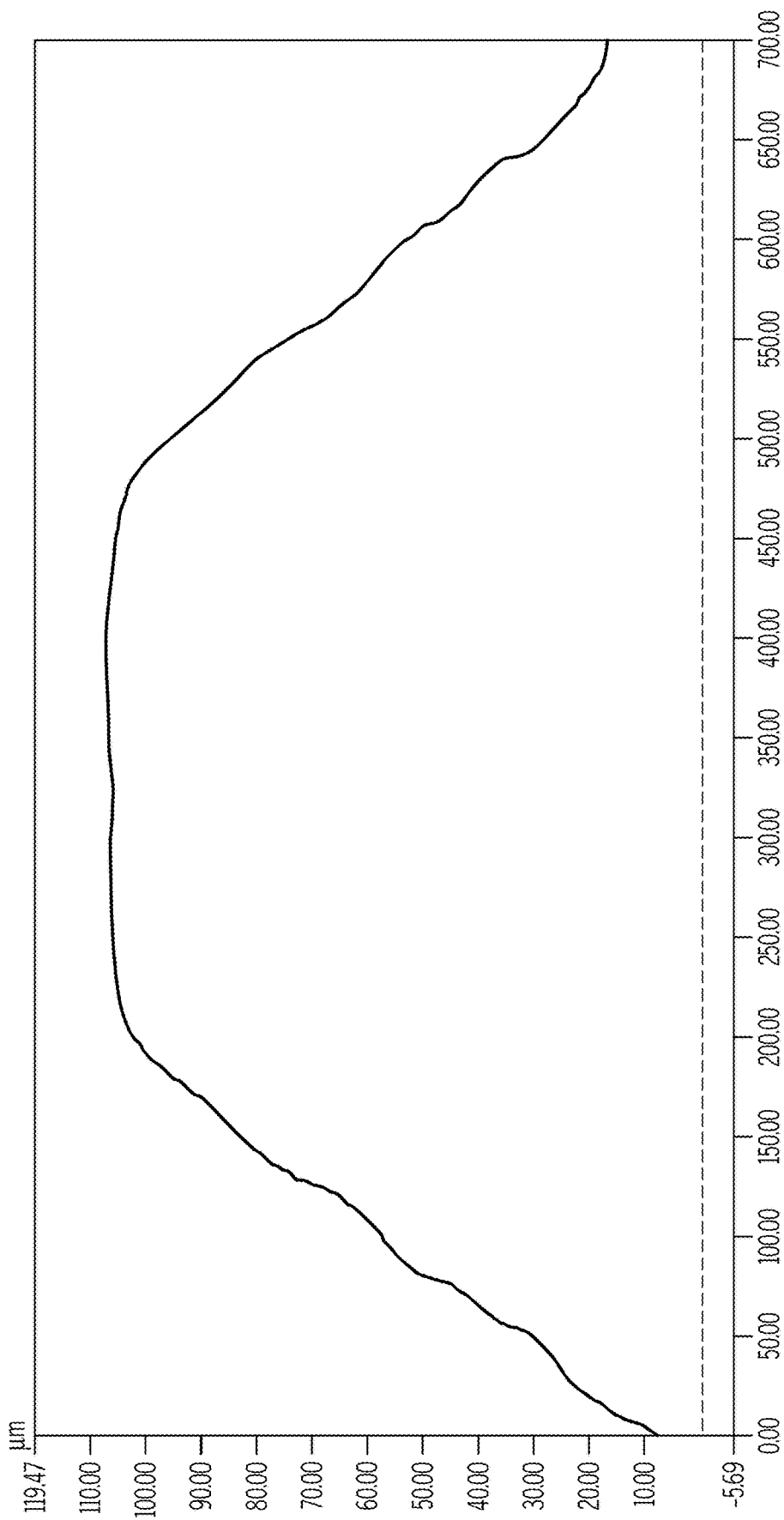
FIG. 14 graphically depicts the surface profile of the defect formed in the transparent workpiece of FIG. 12, according to one or more embodiments shown and described herein.

After damage, the transparent workpiece was separated by applying mechanical and thermal stresses to the glass (to produce a separated part of the type shown in FIG. 11B). FIG. 13 shows an image of a C-chamfer made using this method, and FIG. 14 shows its surface profile.

Aspect 1 of the description is:
A method for processing a transparent workpiece, the method comprising:
  directing a laser beam oriented along a beam pathway into the transparent workpiece, the transparent workpiece having an impingement surface, the laser beam passing through the impingement surface at an impingement location to enter the transparent workpiece,
  wherein:
    a portion of the laser beam directed into the transparent workpiece produces a laser beam focal line in the transparent workpiece and generates an induced absorption to produce a defect within the transparent workpiece, the laser beam focal line comprising:
      a wavelength λ;
      a spot size $w_o$;
      a Rayleigh range $Z_R$ that is greater than $$F_D \frac{\pi w_o^2}{\lambda},$$

where $F_D$ is a dimensionless divergence factor comprising a value of 10 or greater;
- an internal focal line angle of greater than 10° relative to a plane orthogonal to the impingement surface at the impingement location;
- a circular angular spectrum within the transparent workpiece; and
- a length defined by a series of points, each of the points being formed from a plurality of intersecting rays from the laser beam, the intersecting rays being matched in phase.

Aspect 2 of the description is:
The method of Aspect 1, wherein the portion of the laser beam directed into the transparent workpiece comprises a persistent intensity homogeneity.

Aspect 3 of the description is:
The method of Aspect 1 or 2, wherein a portion of the laser beam focal line extends outside of the transparent workpiece, forming an external laser beam focal line above the transparent workpiece.

Aspect 4 of the description is:
The method of Aspect 3, wherein the external laser beam focal line extends at least 0.01 mm above the transparent workpiece along a plane orthogonal to the transparent workpiece.

Aspect 5 of the description is:
The method of Aspect 3 or 4, wherein the external laser beam focal line comprises an external focal line angle, which is greater than the internal focal line angle.

Aspect 6 of the description is:
The method of any of Aspects 3-5, wherein the external laser beam focal line comprises a circular angular spectrum.

Aspect 7 of the description is:
The method of any of Aspects 1-6, further comprising impinging the laser beam onto a phase-altering optical element positioned upstream of the impingement surface, the phase-altering optical element applying a phase alteration to the laser beam.

Aspect 8 of the description is:
The method of Aspect 7, wherein the laser beam comprises a first set of rays and a second set of rays, and the method further comprises obstructing the second set of rays with an optical blocking element.

Aspect 9 of the description is:
The method of Aspect 8, wherein the first set of rays define a first annular segment of the laser beam and the second set of rays define a second annular segment of the laser beam.

Aspect 10 of the description is:
The method of Aspect 9, wherein:
- an average radius of the second annular segment is less than an average radius of the first annular segment; and
- the first set of rays forms at least a portion of the laser beam focal line that begins at an origin point within the transparent workpiece and the second set of rays are aligned such that, if unobstructed, the second set of rays would form at least a portion of the laser beam focal line extending to the origin point in a beam propagation direction.

Aspect 11 of the description is:
The method of Aspect 10, wherein:
- the method further comprises obstructing the first set of rays with the optical blocking element;
- the portion of the laser beam focal line formed by the first set of rays comprises an internal focal line angle of from 0° to 10° or from 170° to 180° relative to the plane orthogonal to the impingement surface; and
- the portion of the laser beam focal line formed by the second set of rays comprises an internal focal line angle of greater than 10° and less than 80° or of greater than 100° and less than 170° relative to the plane orthogonal to the impingement surface.

Aspect 12 of the description is:
The method of Aspect 9, wherein:
- an average radius of the first annular segment is less than an average radius of the second annular segment; and
- the first set of rays forms at least a portion of the laser beam focal line that terminates at a termination point within the transparent workpiece and the second set of rays are aligned such that, if unobstructed, the second set of rays would form at least a portion of the laser beam focal line extending beyond the termination point in a beam propagation direction.

Aspect 13 of the description is:
The method of Aspect 12, wherein:
- the method further comprises obstructing the first set of rays with the optical blocking element;
- the portion of the laser beam focal line formed by the first set of rays comprises an internal focal line angle of from 0° to 10° or from 170° to 180° relative to the plane orthogonal to the impingement surface; and
- the portion of the laser beam focal line formed by the second set of rays comprises an internal focal line angle of greater than 10° and less than 80° or of greater than 100° and less than 170° relative to the plane orthogonal to the impingement surface.

Aspect 14 of the description is:
The method of Aspect 7, wherein the laser beam with phase alteration comprises a first set of rays and a second set of rays, the first set of rays forming a first portion of the laser beam focal line in the transparent workpiece.

Aspect 15 of the description is:
The method of Aspect 14, wherein the second set of rays forms a second portion of the laser beam focal line in the transparent workpiece, the second portion of the laser beam focal line having an internal focal line angle that differs from the internal focal line angle of the first portion of the laser beam focal line.

Aspect 16 of the description is:
The method of Aspect 15, wherein the laser beam with phase alteration comprises a third set of rays, the third set of rays forms a third portion of the laser beam focal line in the transparent workpiece, the third portion of the laser beam focal line having an internal focal line angle that differs from the internal focal line angle of the second portion of the laser beam focal line and the internal focal line angle of the first portion of the laser beam focal line.

Aspect 17 of the description is:
The method of Aspect 7, wherein the laser beam with phase alteration has a first phase, the first phase produced by the phase-altering optical element in a first configuration, the method further comprising transforming the phase-altering optical element to a second configuration, the second configuration producing a laser beam with a second phase alteration.

Aspect 18 of the description is:
The method of Aspect 17, wherein the first configuration comprises a first phase mask and the second configuration comprises a second phase mask.

Aspect 19 of the description is:
The method of Aspect 17 or 18, wherein the transforming comprises repositioning the phase-altering optical element.

Aspect 20 of the description is:
The method of Aspect 7, wherein the phase altering optical element comprises a static phase altering optical element.

Aspect 21 of the description is:
The method of Aspect 20, wherein:
the static phase altering optical element comprises an oblong axicon having a base portion and a conical portion extending from the base portion; and
the base portion comprises an oblong perimeter having an axis of symmetry extending from a first axis end, having a first radius of curvature, to a second axis end, having a second radius of curvature, where the first radius of curvature of the base portion and the second radius of curvature of the base portion are different.

Aspect 22 of the description is:
The method of Aspect 7, wherein the phase altering optical element comprises an adaptive phase altering optical element.

Aspect 23 of the description is:
The method of Aspect 22, wherein the adaptive phase altering optical element comprises a spatial light modulator, a deformable mirror, or an adaptive phase plate.

Aspect 24 of the description is:
The method of any of Aspects 1-23, wherein the defect comprises a defect angle within the transparent workpiece of greater than 10° relative to a plane orthogonal to the impingement surface at the impingement location.

Aspect 25 of the description is:
The method of any of Aspects 1-24, wherein the internal focal line angle is from greater than 10° to 40°.

Aspect 26 of the description is:
The method of any of Aspects 1-24, wherein the internal focal line angle is from 15 to 40°.

Aspect 27 of the description is:
The method of any of Aspects 1-24, wherein the internal focal line angle is from 20 to 40°.

Aspect 28 of the description is:
The method of any of Aspects 1-27, further comprising translating at least one of the transparent workpiece and the laser beam relative to each other along a contour line to form a contour comprising a plurality of defects.

Aspect 29 of the description is:
The method of Aspect 28, wherein the contour line comprises a curved contour line, the contour comprises a curved contour, and the method further comprises rotating the laser beam while translating at least one of the transparent workpiece and the laser beam relative to each other along the curved contour line such that each defect of the plurality of defects is directed radially inward or radially outward relative the curved contour line.

Aspect 30 of the description is:
The method of Aspect 29, wherein the curved contour line comprises a closed curved contour line and the curved contour comprises a closed curved contour.

Aspect 31 of the description is:
The method of any of Aspects 28-30, further comprising applying a stress to the contour to separate the transparent workpiece along the contour.

Aspect 32 of the description is:
The method of Aspect 31, wherein the stress comprises a thermal stress, a mechanical stress, or a combination thereof.

Aspect 33 of the description is:
The method of any of Aspects 1-32, wherein the laser beam comprises a pulsed laser beam output by a beam source that produces pulse bursts comprising 2 sub-pulses per pulse burst or more.

Aspect 34 of the description is:
The method of any of Aspects 1-33, wherein the dimensionless divergence factor $F_D$ comprises a value of from about 10 to about 2000.

Aspect 35 of the description is:
The method of any of Aspects 1-34, wherein a spacing between adjacent defects is about 50 µm or less.

Aspect 36 of the description is:
The method of any of Aspects 1-35, wherein the impingement surface comprises a non-planar topography.

Aspect 37 of the description is:
The method of any of Aspects 1-36, wherein the laser beam focal line intersects the impingement surface.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for processing a transparent workpiece, the method comprising:
   directing a laser beam oriented along a beam pathway into the transparent workpiece, the transparent workpiece having an impingement surface, the laser beam passing through the impingement surface at an impingement location to enter the transparent workpiece,
   wherein:
      a portion of the laser beam directed into the transparent workpiece produces a laser beam focal line in the transparent workpiece and generates an induced absorption to produce a defect within the transparent workpiece, the laser beam focal line comprising:
         a wavelength $\lambda$;
         a spot size $w_o$;
         a Rayleigh range $Z_R$ that is greater than $$F_D \frac{\pi w_o^2}{\lambda},$$

where $F_D$ is a dimensionless divergence factor comprising a value of 10 or greater;
         an internal focal line angle of greater than 10° relative to a plane orthogonal to the impingement surface at the impingement location;
         a circular angular spectrum within the transparent workpiece; and
         a length defined by a series of points, each of the points being formed from a plurality of intersecting rays from the laser beam, the intersecting rays being matched in phase.

2. The method of claim 1, wherein the portion of the laser beam directed into the transparent workpiece comprises a persistent intensity homogeneity.

3. The method of claim 1, wherein a portion of the laser beam focal line extends outside of the transparent workpiece, forming an external laser beam focal line above the transparent workpiece.

4. The method of claim 3, wherein the external laser beam focal line comprises an external focal line angle, which is greater than the internal focal line angle.

5. The method of claim 1, further comprising impinging the laser beam onto a phase-altering optical element positioned upstream of the impingement surface, the phase-altering optical element applying a phase alteration to the laser beam.

6. The method of claim 5, wherein the laser beam comprises a first set of rays and a second set of rays, and the method further comprises obstructing the second set of rays with an optical blocking element.

7. The method of claim 6, wherein the first set of rays define a first annular segment of the laser beam and the second set of rays define a second annular segment of the laser beam.

8. The method of claim 7, wherein:
   an average radius of the second annular segment is less than an average radius of the first annular segment; and
   the first set of rays forms at least a portion of the laser beam focal line that begins at an origin point within the transparent workpiece and the second set of rays are aligned such that, if unobstructed, the second set of rays would form at least a portion of the laser beam focal line extending to the origin point in a beam propagation direction.

9. The method of claim 8, wherein:
   the method further comprises obstructing the first set of rays with the optical blocking element;
   the portion of the laser beam focal line formed by the first set of rays comprises an internal focal line angle of from 0° to 10° or from 170° to 180° relative to the plane orthogonal to the impingement surface; and
   the portion of the laser beam focal line formed by the second set of rays comprises an internal focal line angle of greater than 10° and less than 80° or of greater than 100° and less than 170° relative to the plane orthogonal to the impingement surface.

10. The method of claim 7, wherein:
    an average radius of the first annular segment is less than an average radius of the second annular segment; and
    the first set of rays forms at least a portion of the laser beam focal line that terminates at a termination point within the transparent workpiece and the second set of rays are aligned such that, if unobstructed, the second set of rays would form at least a portion of the laser beam focal line extending beyond the termination point in a beam propagation direction.

11. The method of claim 10, wherein:
    the method further comprises obstructing the first set of rays with the optical blocking element;
    the portion of the laser beam focal line formed by the first set of rays comprises an internal focal line angle of from 0° to 10° or from 170° to 180° relative to the plane orthogonal to the impingement surface; and
    the portion of the laser beam focal line formed by the second set of rays comprises an internal focal line angle of greater than 10° and less than 80° or of greater than 100° and less than 170° relative to the plane orthogonal to the impingement surface.

12. The method of claim 5, wherein the laser beam with phase alteration comprises a first set of rays and a second set of rays, the first set of rays forming a first portion of the laser beam focal line in the transparent workpiece.

13. The method of claim 12, wherein the second set of rays forms a second portion of the laser beam focal line in the transparent workpiece, the second portion of the laser beam focal line having an internal focal line angle that differs from the internal focal line angle of the first portion of the laser beam focal line.

14. The method of claim 13, wherein the laser beam with phase alteration comprises a third set of rays, the third set of rays forms a third portion of the laser beam focal line in the transparent workpiece, the third portion of the laser beam focal line having an internal focal line angle that differs from the internal focal line angle of the second portion of the laser beam focal line and the internal focal line angle of the first portion of the laser beam focal line.

15. The method of claim 5, wherein the laser beam with phase alteration has a first phase, the first phase produced by the phase-altering optical element in a first configuration, the method further comprising transforming the phase-altering optical element to a second configuration, the second configuration producing a laser beam with a second phase alteration.

16. The method of claim 15, wherein the first configuration comprises a first phase mask and the second configuration comprises a second phase mask.

17. The method of claim 5, wherein the phase altering optical element comprises a static phase altering optical element.

18. The method of claim 17, wherein:
- the static phase altering optical element comprises an oblong axicon having a base portion and a conical portion extending from the base portion; and
- the base portion comprises an oblong perimeter having an axis of symmetry extending from a first axis end, having a first radius of curvature, to a second axis end, having a second radius of curvature, where the first radius of curvature of the base portion and the second radius of curvature of the base portion are different.

19. The method of claim 1, wherein the defect comprises a defect angle within the transparent workpiece of greater than 10° relative to a plane orthogonal to the impingement surface at the impingement location.

20. The method of claim 1, wherein the internal focal line angle is from greater than 10° to 40°.

21. The method of claim 1, wherein the laser beam comprises a pulsed laser beam output by a beam source that produces pulse bursts comprising 2 sub-pulses per pulse burst or more.

22. The method of claim 1, wherein the laser beam focal line intersects the impingement surface.

* * * * *